(12) United States Patent
Welle

(10) Patent No.: US 9,091,459 B2
(45) Date of Patent: Jul. 28, 2015

(54) SEGMENTED FRESNEL SOLAR CONCENTRATOR

(76) Inventor: Richard Welle, Huntington Beach, CA (US)

( * ) Notice: Subject to any disclaimer, the term of this patent is extended or adjusted under 35 U.S.C. 154(b) by 893 days.

(21) Appl. No.: 13/202,984

(22) PCT Filed: Feb. 28, 2010

(86) PCT No.: PCT/US2010/025707
§ 371 (c)(1),
(2), (4) Date: Aug. 24, 2011

(87) PCT Pub. No.: WO2010/099516
PCT Pub. Date: Sep. 2, 2010

(65) Prior Publication Data
US 2011/0303214 A1 Dec. 15, 2011

Related U.S. Application Data

(60) Provisional application No. 61/208,913, filed on Feb. 28, 2009, provisional application No. 61/209,681, filed on Mar. 10, 2009.

(51) Int. Cl.
| | |
|---|---|
| *F24J 2/10* | (2006.01) |
| *F24J 2/07* | (2006.01) |
| *F24J 2/14* | (2006.01) |
| *F24J 2/18* | (2006.01) |
| *F24J 2/28* | (2006.01) |
| *F24J 2/34* | (2006.01) |
| *F24J 2/46* | (2006.01) |

(Continued)

(52) U.S. Cl.
CPC .... *F24J 2/07* (2013.01); *F24J 2/14* (2013.01); *F24J 2/18* (2013.01); *F24J 2/28* (2013.01); *F24J 2/34* (2013.01); *F24J 2/4609* (2013.01); *F24J 2/5403* (2013.01); *F24J 2/5417* (2013.01); *F24J 2002/075* (2013.01); *F24J 2002/108* (2013.01); *F24J 2002/385* (2013.01); *F24J 2002/5468* (2013.01); *Y02E 10/41* (2013.01); *Y02E 10/44* (2013.01); *Y02E 10/45* (2013.01); *Y02E 10/47* (2013.01)

(58) Field of Classification Search
CPC ............... F24J 2/06; F24J 2/10; F24J 2/5417; F24J 2002/06; F24J 2002/10; F24J 2002/385
USPC .................. 126/600, 678, 679, 688, 692, 698
See application file for complete search history.

(56) References Cited

U.S. PATENT DOCUMENTS

| | | | | |
|---|---|---|---|---|
| 3,869,199 | A * | 3/1975 | Cummings | 126/651 |
| 3,905,352 | A * | 9/1975 | Jahn | 126/578 |
| 4,026,273 | A * | 5/1977 | Parker | 126/649 |

(Continued)

*Primary Examiner* — Jorge Pereiro
(74) *Attorney, Agent, or Firm* — Lewis Brisbois Bisgard & Smith LLP; Jon Hokanson

(57) ABSTRACT

A solar collector including a linear receiver and an array of linear mirrors positioned to concentrate sunlight onto the linear receiver, with all of the mirrors in the array tracking solar motion in a direction perpendicular to the longitudinal axis of the receiver, a fraction of the mirrors tracking solar motion in a direction parallel to the longitudinal axis of the receiver and a two-axis steering mechanism adapted to combine the linear images formed by each linear mirror into a single linear image that remains focused on the linear receiver as the mirrors rotate about the two axes, with the linear receiver incorporating a secondary concentrator, and concentrated sunlight heating an atmospheric-pressure gas-phase heat-transfer fluid.

30 Claims, 12 Drawing Sheets

(51) Int. Cl.
*F24J 2/54* (2006.01)
*F24J 2/38* (2014.01)

(56) References Cited

U.S. PATENT DOCUMENTS

| | | | | |
|---|---|---|---|---|
| 4,110,010 A | * | 8/1978 | Hilton | 359/853 |
| 4,148,564 A | * | 4/1979 | Devin et al. | 359/852 |
| 4,149,521 A | * | 4/1979 | Fletcher et al. | 126/693 |
| 4,198,826 A | * | 4/1980 | Chromie | 60/641.15 |
| 4,261,335 A | * | 4/1981 | Balhorn | 126/602 |
| 4,301,321 A | * | 11/1981 | Bartels | 136/246 |
| 4,307,711 A | * | 12/1981 | Doundoulakis | 126/677 |
| 4,312,326 A | * | 1/1982 | Johnson, Jr. | 126/606 |
| 4,385,430 A | * | 5/1983 | Bartels | 29/458 |
| 4,402,582 A | * | 9/1983 | Rhodes | 353/3 |
| 4,512,335 A | * | 4/1985 | Mori | 126/678 |
| 4,520,794 A | * | 6/1985 | Stark et al. | 126/684 |
| 4,548,195 A | * | 10/1985 | Balhorn | 126/602 |
| 4,586,488 A | * | 5/1986 | Noto | 126/578 |
| 4,696,554 A | * | 9/1987 | Seawright | 359/853 |
| 5,154,163 A | * | 10/1992 | Rabl | 126/690 |
| 5,542,409 A | * | 8/1996 | Sampayo | 126/606 |
| 6,945,246 B2 | * | 9/2005 | Kinoshita | 126/605 |
| 7,192,146 B2 | * | 3/2007 | Gross et al. | 359/853 |
| 7,207,327 B2 | * | 4/2007 | Litwin et al. | 126/601 |
| 7,711,441 B2 | * | 5/2010 | Tillotson | 700/59 |
| 7,905,227 B2 | * | 3/2011 | Luconi et al. | 126/696 |
| 7,923,624 B2 | * | 4/2011 | Borton | 136/246 |
| 8,122,878 B1 | * | 2/2012 | Gross et al. | 126/600 |
| 8,162,495 B2 | * | 4/2012 | Green | 359/853 |
| 8,450,597 B2 | * | 5/2013 | Zahuranec et al. | 136/246 |
| 8,490,396 B2 | * | 7/2013 | Xiang | 60/641.11 |
| 8,511,298 B2 | * | 8/2013 | Ven | 126/685 |
| 2004/0163697 A1 | * | 8/2004 | Papadopoulos | 136/246 |
| 2005/0274376 A1 | * | 12/2005 | Litwin et al. | 126/685 |
| 2008/0128017 A1 | * | 6/2008 | Ford | 136/248 |
| 2008/0264409 A1 | * | 10/2008 | Shukla | 126/575 |
| 2008/0314437 A1 | * | 12/2008 | Regev | 136/246 |
| 2009/0000613 A1 | * | 1/2009 | Edwards et al. | 126/684 |
| 2009/0056699 A1 | * | 3/2009 | Mills et al. | 126/600 |
| 2009/0183731 A1 | * | 7/2009 | Capan | 126/605 |
| 2009/0314325 A1 | * | 12/2009 | Borton | 136/246 |
| 2010/0000519 A1 | * | 1/2010 | Zalusky et al. | 126/601 |
| 2010/0006139 A1 | * | 1/2010 | Zahuranec et al. | 136/246 |
| 2010/0195227 A1 | * | 8/2010 | Green | 359/853 |
| 2010/0212655 A1 | * | 8/2010 | Henkel-Wallace et al. | 126/605 |
| 2011/0235025 A1 | * | 9/2011 | Blumenthal et al. | 356/138 |

* cited by examiner

SEGMENTED FRESNEL SOLAR CONCENTRATOR

This application is a 371 of PCT/US10/25707 filed Feb. 28, 2010, which claims benefit of provisional application 61/208,913, filed Feb. 28, 2009, and claims benefit of 61/209,681, filed Mar. 10, 2009.

TECHNICAL FIELD

The present systems and methods are directed to collecting and concentrating sunlight and converting that sunlight efficiently to electric power.

BACKGROUND ART

The potential for primary energy production through the capture and conversion of incident solar energy is immense, principally because of the magnitude of the available resource; the solar flux intercepted by the Earth averages about 1.3 kW/m$^2$. After accounting for atmospheric absorption, the total solar flux falling on the Earth exceeds the worlds total electric power demand by a factor of 50,000. That more of the worlds energy demand is not satisfied by solar conversion is due to the diffuse nature and time variability of the solar flux, and to the immaturity of the technologies required to overcome these limitations.

If appropriate systems can be developed both for collecting and for storing solar energy, it would be possible to satisfy the entire world demand for electricity by covering 22,000 square kilometers of desert with solar collectors. Currently, no more than a few square kilometers of solar collectors are in operation in the world. If the technology of solar power can be made economically competitive with alternate power technologies, the potential for rapid growth in solar is very large.

Two fundamentally different technologies are available for converting sunlight to electricity: photovoltaic and thermodynamic. Photovoltaic technology is familiar to most people, even if only in the form of solar-powered calculators. Photovoltaics convert the incident light to electricity through a quantum mechanical process, and depend on the manufacture of precisely defined surface structures in semiconductors using processes developed extensively over recent decades for the computer and electronics industry. Although significant progress has been made in improving the efficiency and reducing the cost of solar cells, they are still far too expensive to compete with traditional power sources, except in niche applications.

Thermodynamic solar power systems work by using concentrated sunlight to heat a working fluid that is then expanded through a turbine (or other thermodynamic engine) to drive a generator. Because the sunlight is concentrated, these systems are referred to as Concentrating Solar Power (CSP). Except for using solar power as the heat source, the process is analogous to fossil-fueled or nuclear power stations, which also produce electricity by heating a working fluid and extracting power through a thermodynamic engine. Other than the source of the heat, the two systems are functionally identical. In each case, the heat is used to heat a working fluid that is then expanded through a thermodynamic engine (most often a Rankine-cycle engine) attached to a generator that produces electricity. Waste heat is rejected to the environment. There is an extensive installed base of both industrial capacity and technical know-how in thermodynamic power conversion. Solar thermodynamic power systems can take advantage of this installed industrial base if they can be designed to provide heat with characteristics that match the characteristics of the heat produced by fossil-fueled or nuclear power plants. The two key characteristics of process heat are the working temperature and the rate of heat production. Current solar thermodynamic power systems generally fail to match either of these characteristics.

With respect to working temperature, most fossil- or nuclear-fueled systems using steam turbines operate with hot-side temperatures near 600 C. This temperature has become the default for most thermodynamic power systems through many decades of engineering experience and involves compromises among efficiency and cost, the material properties of system components, and the thermodynamic properties of the working fluid (most often water). Because of limitations inherent in current technologies for solar concentrators, most solar-thermodynamic systems operate at a working temperature of less than 375 C. The lower temperature makes them incompatible with the available technology for thermodynamic power conversion operating at temperatures near 600 C.

A solar receiver operating at 600 C will lose energy through infrared radiation at a rate of about 32 kW/m$^2$. Because sunlight falling on the earth's surface carries at most about 1.1 kW/m$^2$, high working temperatures are possible only if the sunlight is concentrated using a reflecting or refracting collector and focused on a receiver with a smaller area. If the infrared losses are to be limited to no more than 10% of the incident solar radiation, the concentration ratio (the ratio between collector area and receiver area; abbreviated CR) must be (at peak solar flux) at least 340. If the effective solar flux is reduced (through atmospheric absorption, or when the sun is not in a direction perpendicular to the aperture of the collector), the required concentration ratio is much larger.

Because the sun is not stationary in the sky, solar concentrators require tracking systems to keep them pointed at the sun, and systems with higher concentration ratios require more precise tracking systems. Solar tracking systems come in two distinct categories. In dual-axis systems, the sunlight is focused to a small spot, and the tracking occurs about two axes to keep that spot focused on the receiver. In single-axis systems, sunlight is concentrated along a linear focus, and the system tracks only the component of solar motion around an axis parallel to that focal line. The component of solar motion around a perpendicular axis is not tracked. Instead, the solar motion in this direction results in the solar image being displaced along the receiver axis. However, since the linear receiver is highly elongated, the shift in the image location does not move the solar image off the receiver (except at the ends), and does not significantly decrease the total energy absorption. The four most common types of solar concentrators include two dual-axis systems and two linear systems.

The dual-axis paraboloidal dish collector typically includes a large paraboloidal reflector built either as a single unit or as an array of individual mirrors on a single frame, concentrating sunlight at the focus of the dish. Typical dish systems will have a CR of 2000 or more. The main drawbacks of dish systems are that they require high-precision tracking systems operating with complete freedom of movement in two axes; both the dish and the receiver have to move, making the tracked mass very large; and the receiver is isolated at the end of a long arm, making it difficult to collect the heat at a large-scale central power conversion facility, requiring therefore a power conversion unit on each dish. The dual-axis solar power tower consists of a central receiving unit typically located on a tower, surrounded by a field of flat mirrors, each on a pedestal with a two-axis tracking system. While this design overcomes some of the deficiencies of the paraboloidal dish systems, particularly by having a stationary central receiver, there are still drawbacks due to the requirement for high-precision two-axis tracking systems on each of the mirrors. The requirements are made further complex because no two of the mirrors are in the same location relative to the receiver, so each mirror must track the sun in a slightly different way. In addition, because of issues with shading (where sunlight falling on a mirror can be reduced because it is first intercepted by a nearby mirror) and blocking (where sunlight reflected by one mirror falls on the back of a nearby mirror rather than on the receiver), the mirror array cannot completely cover the surface around the tower, limiting the fraction of sunlight incident on the ground that can be collected at the receiver (the ground utility factor). Dish collectors do not have issues with blocking, but shading restrictions, as well as restrictions to prevent physical contact between adjacent dishes, also limit their ground utility factor.

Solar concentrators with linear receivers tend to be simpler and less expensive than dual-axis systems, but generally cannot operate efficiently at temperatures compatible with conventional thermodynamic power systems. The single-axis parabolic trough collector includes a linear parabolic trough-shaped reflector and a linear receiver at the focus of the reflector. The system, including both reflector and receiver, rotates about an axis parallel to the receiver to track one component of the solar motion (typically the east-west component). Parabolic trough collectors are relatively easy to build, are modular, and lend themselves well to scaling up to very high power levels. As such, the majority of worldwide installed CSP systems are of this basic type. Because of the finite angular diameter of the sun, the maximum CR theoretically possible with single-axis concentration is about 215. In practical parabolic trough systems, the CR rarely exceeds 60, which is clearly not high enough to achieve a working temperature of 600 C. In addition, adjacent troughs are typically spaced at least four trough widths apart to avoid shading, so the ground utility factor is not more than 25%. The single axis linear Fresnel collector includes a stationary linear receiver and an array of linear reflectors that each individually tracks the sun by rotating about an axis parallel to the receiver axis in order to keep the image of the sun focused on the linear receiver. Compared to parabolic trough systems, which have moving receivers, the linear Fresnel systems are simpler because the receiver is stationary and only the reflectors need to move. In addition, because the location of the reflector is fixed relative to the fixed receiver, the required angular rotation of the Fresnel reflectors is only half that of the parabolic trough reflectors. The lower moving mass, the smaller angular displacement, and the reduced exposure to wind loads means that the tracking system for the linear Fresnel systems is significantly simpler and less expensive than for the parabolic trough systems. While linear Fresnel systems typically have ground utility factors of 90% or greater, they do have issues with shading and blocking. The overall efficiency of a typical linear Fresnel system is less than that of a parabolic trough system. No known practical way is available to build a linear-receiver solar concentrator with a working temperature of 600 C or higher.

With respect to the rate of heat production, the key difference between conventional (fossil or nuclear) thermodynamic power systems and CSP thermodynamic power systems is that conventional systems can run continuously, and some are designed specifically to stop and start on demand for satisfying peak loads, while solar concentrators provide heat only when the sun is shining.

While means are available for storing thermal energy to allow conversion to electricity on demand, these means are relatively inefficient and expensive, and can typically store only enough heat for a few hours of electricity production. Various methods have been proposed in the past several decades for storing thermal energy for solar power applications, including storage as sensible heat (heat associated with a temperature change in an otherwise unchanging material), latent heat (heat associated with a phase change), and in reversible thermochemical reactions. In principle, almost any material can provide a basis for sensible heat storage. In practice, the material must be stable over the entire temperature range of interest, and it would preferably have a high specific heat on a mass or volume basis, and be readily available, safe, inexpensive, and environmentally benign. If the storage material is liquid, it requires an appropriate storage tank (including pressure containment if the liquid has a high vapor pressure). If the storage material is solid, some means must be developed for transferring the heat into and out of the storage material. In latent heat storage systems, heat added to the system is absorbed (at a constant temperature) as heat of fusion when the storage medium melts. Heat is given up when the storage medium solidifies. These systems require both a tank to contain the storage medium when it is in the liquid phase, and a method for moving heat in and out of the system that is compatible with both solid and liquid phases of the storage medium. These systems can store heat only at the temperature of the phase change, and a storage medium is needed with a phase change in the right temperature range. For single-axis linear collectors such as the parabolic trough and the linear Fresnel systems, which normally use a liquid-phase working fluid circulating through the receiver to collect the solar energy, the most commonly proposed storage method is simply a tank to contain a large volume of the hot working fluid. While conceptually simple, this method is constrained by the cost of the working fluid. The volume of fluid stored in the tank can be reduced by including a large mass of solid particles in a packed-bed thermal storage system. In this configuration, only the void area between the particles is filled with the working fluid. However, since practical packed-beds have void fractions in excess of 30%, there is still a requirement for a large volume of working fluid to achieve substantial thermal storage. No known practical way is available to provide thermal storage for solar concentrators sufficient to provide several days of electric power production.

DISCLOSURE OF INVENTION

The present application is related to and claims priority on U.S. provisional applications 61/208913, filed 28 Feb. 2009, and 61/209681, filed 10 Mar. 2009, the entirety of each of which is incorporated by reference herein.

In one preferred embodiment, the present system and its operation are directed toward providing a solar collector with a linear receiver having a concentration ratio greater than 250.

In another preferred embodiment, the present system and its operation are directed toward providing a solar collector compatible with an ultra-large-scale thermal storage system.

BEST MODE FOR CARRYING OUT THE INVENTION

With reference to FIGS. 1-13b preferred embodiments of the present systems and methods will be described.

Industrial Applicability

The present solar concentrator is applicable to enable collection of solar energy for the production of electricity. Specifically, the systems and methods described herein may be used to convert incident solar energy to thermal energy (with an efficiency in excess of 70 %) and to store that thermal energy for periods greater than one day. The thermal energy, either directly, or after storage, may be converted to electricity through the use of a thermodynamic engine as in a conventional fossil- or nuclear-fueled power plant. Most such power plants use Rankine-cycle engines to convert heat to electricity, and the description below will be directed toward that embodiment. However, it should be understood that other thermodynamic engines, such as Stirling or Brayton cycle engines may also be used. It should also be understood that the concentrator geometry disclosed herein could be used for other applications, such as concentrated illumination of photovoltaic cells, or concentrated heating of thermoelectric power conversion devices.

APPLICATION EXAMPLE

Figure 1:
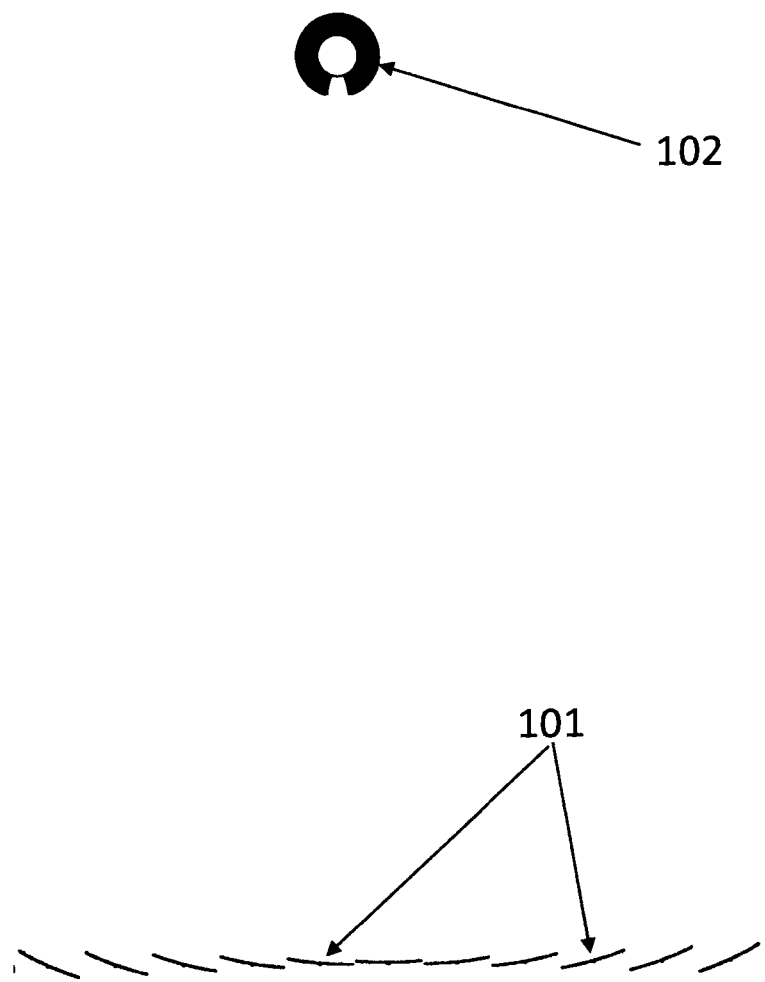
FIG. 1 is a cross-sectional end view of a Fresnel solar concentrator.
Figure 2A:
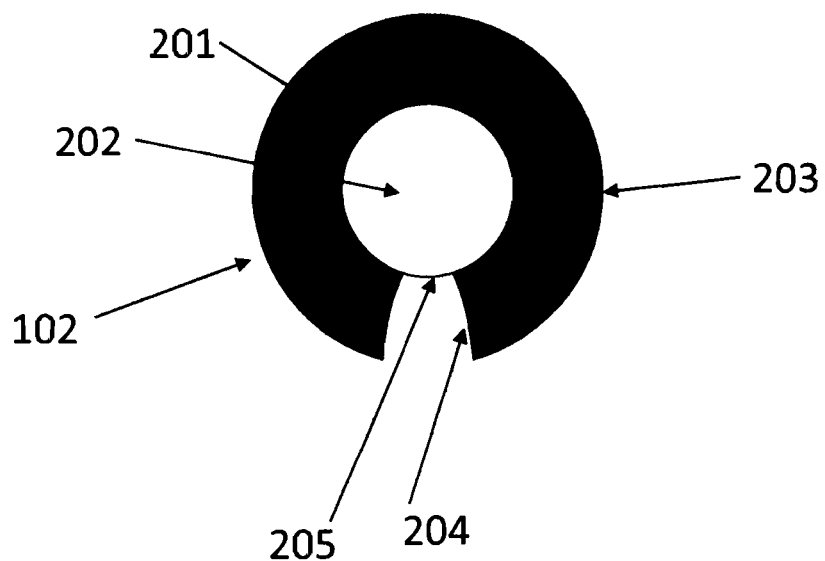
FIG. 2a is a cross-sectional end view of a linear receiver with a secondary concentrator.
Figure 4:
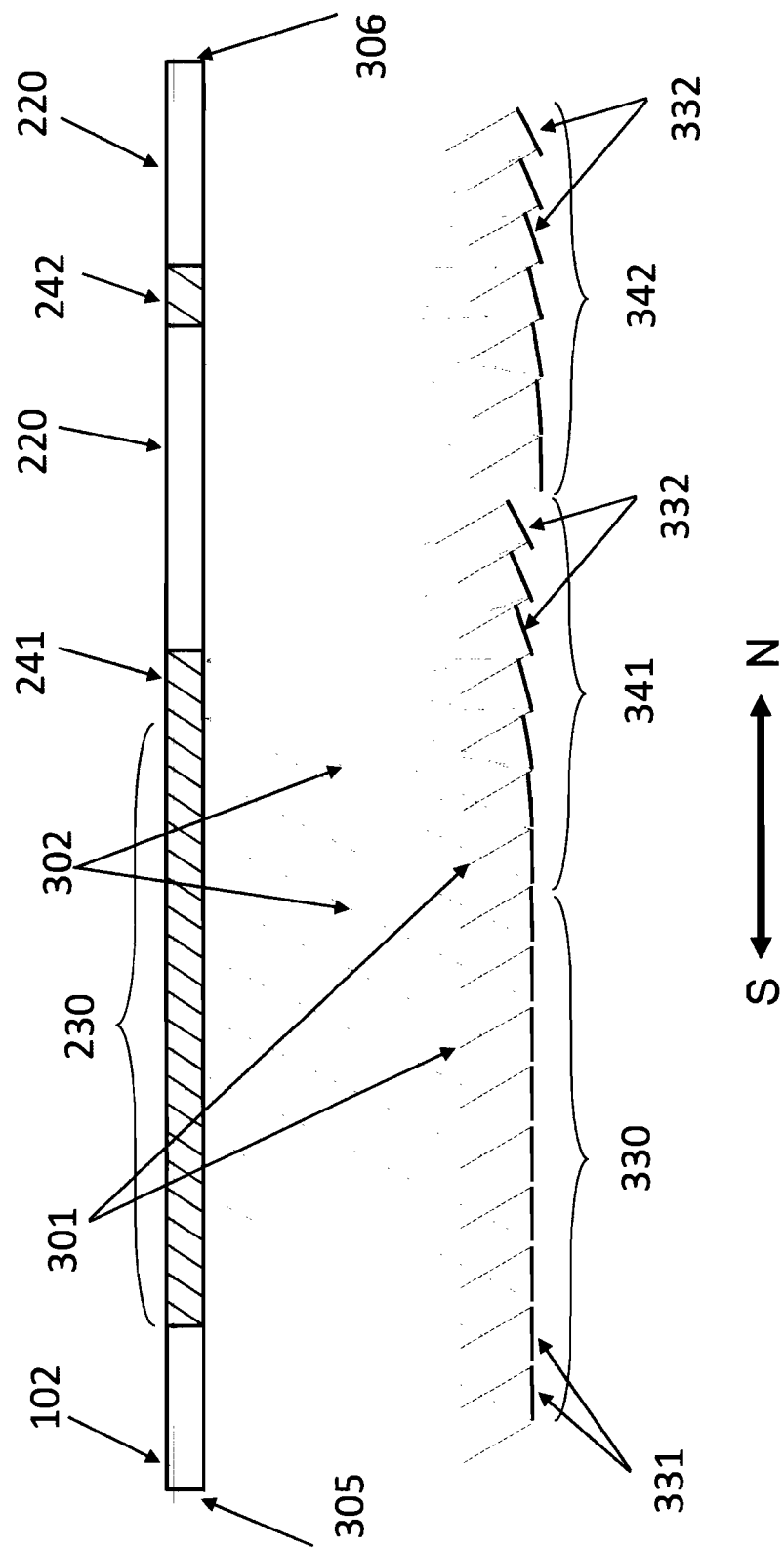
FIG. 4 is a cross-sectional side view of a segmented Fresnel solar concentrator.

The goal of providing a solar concentrator with a linear receiver and a concentration ratio greater than 250 is achieved using a Segmented Fresnel Solar Concentrator (SFSC), which can be thought of as a one-and-one-half-axis concentrator. In a preferred embodiment, the components of this concentrator, illustrated in cross section in FIG. 1, preferably include a set of ground-level, or relatively low level Fresnel-style primary mirrors 101, and a stationary, elevated or relatively high level linear receiving element 102. The linear receiving element has two aspects. One aspect, illustrated in more detail in FIG. 2a, includes a flow tube or conduit 201 to carry a heat transfer fluid (not shown), insulation 203 around the flow tube to minimize thermal losses, a downward-facing secondary concentrator 204, and a window 205 between the secondary concentrator and the flow tube to allow sunlight to enter the flow tube. Within the flow tube there is an absorber material 202 to absorb the sunlight and convert it to heat for transfer to the heat transfer fluid. As illustrated in FIGS. 1 and 2a, this system includes only a single steering axis. The extra half axis is illustrated in FIG. 4, which shows a cross-sectional side view. Referring to FIG. 4, at the inlet or upstream end 305 of the receiving element 102, the temperature is relatively cold, and thermal losses are minimal. As the receiver fluid moves toward the outlet or downstream end 306, the temperature rises to a temperature high enough that the radiation losses become a significant fraction of the total inlet power. To minimize these thermal losses, the Fresnel reflectors 331 at the hot end of the system are segmented in rows along the longitudinal axis of the receiver, that is, from left to right as shown in FIG. 4. The segment rows are then arranged in groups 330, 341, and 342 such that either zero or multiple reflector segment rows are focused on any given segment of the receiver. In some sections 230 of the receiver, there is only one segment row focused on each portion of the receiver; these sections are referred to as "unsegmented" sections in the discussion that follows. In other sections, e.g., 241 and 242 of the receiver, multiple segment rows are focused on each segment of the receiver; these sections are referred to as "segmented." In the sections 230, 241, 242 of the receiving element 102 that are at the focus of any reflector segments, the receiving element incorporates the secondary concentrator and window as illustrated in FIG. 2a. In the sections 220 of the receiving element 102 that are not at the focus of any reflector segments, the receiving element takes on the aspect of FIG. 2b. In this configuration, the receiving element does not include a secondary concentrator or window; instead the receiver is fully insulated to limit heat losses. Conduction and radiation losses are functions of the receiver temperature, but not significant functions of incident sunlight intensity. Thus, by providing for concentration of the incoming sunlight into selected segments of the receiver, and fully insulating the non-illuminated segments of the receiver, the overall thermal losses in the system can be reduced sufficiently to allow the hot-side temperature to rise to 600 C or higher. In comparison to the better known parabolic trough (PT) concentrators, which have a constant concentration ratio of about 50, the concentration ratio in the SFSC varies along the length of the collector, and can be optimized, according to the anticipated local temperature, for thermal efficiency and ease of manufacture and operation. It should also be noted that it is possible, in principle, to reach a hot-side temperature of 600 C with an unsegmented Fresnel system, but the increase in radiative losses leads to a significant reduction in overall system efficiency.

In a preferred embodiment, an SFSC has a primary mirror surface covering an area 40 meters wide by 250 meters long, with a total collector area of 10,000 square meters. This system would collect, at peak sun, about 10 MW of thermal power. It should be understood that both larger and smaller systems could be designed and built. Additionally, of course, scale-up even to multi-gigawatt power levels can be achieved by assembling an array of smaller devices. The following sections describe each of the system components in detail.

Primary Mirror

The first and largest subsystem of the SFSC is the primary mirror array. In a preferred embodiment, the primary reflector is made up of an array of individual mirror elements. Like the PT systems, the SFSC system has a linear receiver, so it is necessary to track the sun along only one axis in the unsegmented areas (see below for a description of tracking on the second axis in the segmented areas). In one preferred embodiment, the receiver axis is oriented in a north-south direction and the mirrors track the east-west component of solar motion. Unlike the PT systems, in which both the primary mirror and the receiver move, in the SFSC the receiver is stationary, and solar tracking is accomplished only by turning the mirrors. In addition, while parabolic trough systems typically use a single mirror, or a set of smaller mirrors all rigidly mounted on a single moving frame, the SFSC system uses an array of mirrors that each track the sun so as to focus the beam on the receiver. In the unsegmented areas of the system, the mirrors are mounted as illustrated in FIG. 1, such that they can rotate about one axis. The axis is oriented north/south such that, as the sun moves from east to west across the sky, the mirror positions are adjusted to keep the reflected linear image of the sun on the entrance aperture of the receiver. Because multiple mirrors focus sunlight onto a single receiver (the characteristic of a Fresnel system), the mirrors are all at slightly different angles to account for their displacement relative to the axis of the system. A detailed description of tracking requirements is presented below.

Figure 5A:
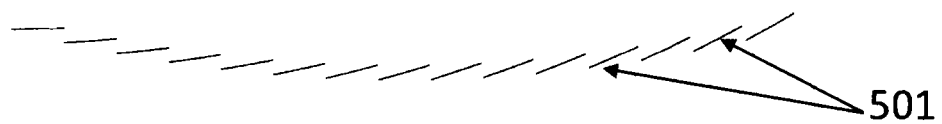
FIG. 5a is a cross-sectional end view of a parabolic Fresnel solar concentrator showing mirror orientations in the morning.
Figure 5B:
FIG. 5b is a cross-sectional end view of a parabolic Fresnel solar concentrator showing mirror orientations at solar noon.
Figure 5C:
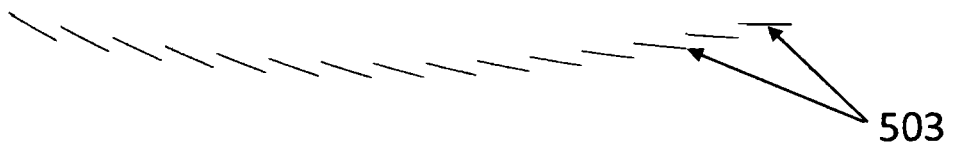
FIG. 5c is a cross-sectional end view of a parabolic Fresnel solar concentrator showing mirror orientations in the afternoon.
Figure 6:
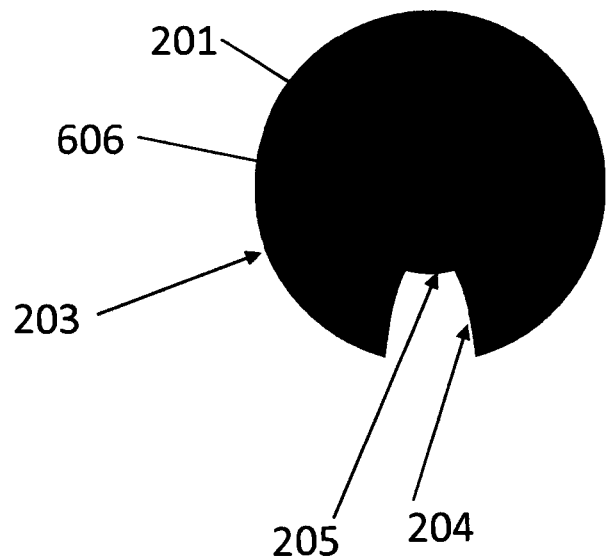
FIG. 6 is a cross-sectional end view of a segment of a linear receiver containing a distributed absorber.
Figure 7:
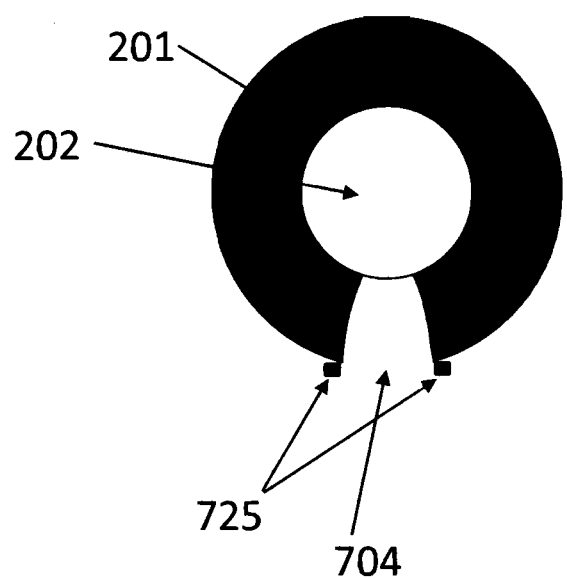
FIG. 7 is a cross-sectional end view of a segment of a linear receiver showing the location of a pair of feedback sensors.

Characteristic of a Fresnel mirror system with closely-spaced mirrors, except at solar noon, the mirror positions are such that a portion of each mirror is shaded by its neighbor. Shading does not reduce the total sunlight available to the receiver since sunlight prevented from falling on a portion on one mirror is instead reflected to the receiver by an adjacent mirror. Shading is a manifestation of the reduction in total solar flux available to the array as the sun moves away from the zenith. The normal solar flux (about 1 kW/m$^2$ at sea level) applies only to areas measured in a plane perpendicular to the collector/sun line. As the collector turns with the turning Earth, the flux intercepted by the collector is reduced by a factor of $\sin(\alpha)$ where $\alpha$ is the elevation angle of the sun above the horizon. The shading does not result in a loss of incident sunlight since the shading is done by another mirror also reflecting the sunlight to the same target. In parabolic trough systems, shading is avoided by leaving an open space between adjacent troughs. This reduces the land-use factor, but ensures that the system operates at a relatively constant concentration ratio. In the SFSC, the maximum concentration ratio can only be attained if the mirrors cover the largest possible fraction of the total surface area. This means that the effective concentration ratio (the ratio between normal-incidence solar flux and the actual flux on the receiver) will vary throughout the day by a factor of $\sin(\alpha)$. However, since the peak concentration is substantially higher than the limits obtainable with PT systems, the effective concentration will remain higher than a PT system throughout much of the day. For a planar array of Fresnel mirrors, it is possible, at certain times of day, for some portion of the light reflected by one mirror to be intercepted by the back side of an adjacent mirror, a phenomenon known as blocking. While the total effect is small, it can be avoided completely by laying out the primary mirrors in a pattern where adjacent mirrors are displaced relative to one another in a direction perpendicular to the plane of the array. FIGS. 5a, 5b, and 5c show an end view (looking south) of such an array at three different times of day; morning (5a) solar noon (5b) and afternoon (5c). In the morning, the mirror elements 501 are rotated toward the east to reflect sunlight to the receiver. Those areas of any mirror elements from which a ray directed at the receiver would be intercepted by an adjacent mirror and be blocked are already shaded by the adjacent mirror. As such, blocking will not occur. At solar noon, the time when blocking is most severe for a planar array of Fresnel mirrors, the individual mirror elements 502 are rotated into positions that allow them to form an overall shape of a parabola, and no back surface of any mirror is exposed for blocking. In the afternoon, the configuration is the mirror image of the morning configuration, and blocking is prevented by appropriate shading. In the embodiment illustrated in FIGS. 5a, 5b, and 5c, all sunlight incident on the mirror array at any time of day is reflected to the receiver without blocking.

The concentration ratio of the Fresnel system can be improved by curving each mirror element to focus the sunlight along a line. In one embodiment, each mirror element is in the form of a parabola with a focal length equal to the distance between the mirror element and the receiver. In another embodiment, each mirror element would be in the form of a segment of a larger parabola with a focal length equal to the distance between the mirror and the receiver. This is, in fact, essentially the same shape used in PT system, with the exception that the focal length of the parabola in the SFSC will be much longer. This means that the minimum radius of curvature of each mirror is much larger, thereby easing manufacturing.

While curving the mirrors allows an increase in concentration ratio, the effect is limited by the finite angular diameter of the sun. Because the sun has an angular diameter of 0.53 degrees as seen from Earth, the image formed by the mirror at the receiver will have an angular width of, at best, 0.53 degrees as seen from the mirror. The entrance aperture on the receiver must be wide enough to accept all of the light from each of the mirror elements. The required width is a function of the total width of the Fresnel system and the height of the receiver above the primary mirror. The ratio of the width of the primary mirror system to the width of the entrance aperture of the receiver can be considered as the concentration ratio of the primary mirror system. This ratio is given by:

$$C_P = \frac{w_p}{w_a} = \frac{w_p}{2h(\tan(\theta) - \tan(\theta - \delta))}$$

where $w_P$, is the width of the primary mirror, $w_a$ is the width of the receiver entrance, h is the height of the receiver above the primary mirror, $\theta = \tan^{-1}(w_p/2h)$ is the acceptance half angle of the receiver, and $\delta$ is the half angle of the solar diameter.

For one preferred embodiment, $w_p = h = 40$ m, and the maximum concentration ratio of the primary mirror is 86. Although this compares very favorably with the concentration ratios of 50-60 typical of parabolic trough systems, three aspects of this system will be described. First, this number is the peak concentration ratio, applicable only when the sun is at the zenith, and it must be multiplied by a factor of $\sin(\alpha)$. The second aspect is that this is not the total concentration even of the unsegmented portion of the collector. As will be described in detail below, the receiver includes a secondary concentrator that further concentrates the incident light by a factor of about two before it reaches the absorber, so the overall peak concentration ratio is about 190. The third aspect is that some concentration is lost when the sun is away from the vertical because parabolic reflectors do not provide an ideal focus when the source is off-axis. Because of this, the entrance aperture of the secondary reflector is preferably increased (by not more than 50%) to accept the imperfectly-focused light from the primary when the sun is at its lowest point. Modifications to the mirror shape can be used to reduce this effect by varying the focal length of the mirror element across its width. Thus, for example, the late afternoon sun will only illuminate the eastern portion of each of the primary mirror elements (the western portion will be shaded by the next mirror element to the west). The shape of the eastern portion of each mirror element is partially adjusted to compensate for the off-axis effects appropriate to its position in the array, while sacrificing some of the on-axis focusing accuracy. Similarly, the western edge of each mirror element would be partially adjusted to compensate for off-axis effects early in the day. The overall shape of each element would thus be adjusted to optimize focusing of the primary mirror through the entire daily period of operation. Compensation for off-axis effects will reduce the effective single-axis peak concentration ratio of the primary/secondary mirror combination to about 120.

A further increase in the concentration ratio is accomplished by segmenting the primary mirror along the north/south axis as illustrated in FIGS. 3 and 4. FIG. 4 shows a cross section of a portion of the system looking from east to west (from a northern hemisphere perspective), i.e., looking into the page. The image includes three sets of primary mirror segments and the corresponding receiver segments. The inlet 305 to the receiver 102 is at the south end of the collector. The temperature in this region is relatively cool, so there is little benefit to segmenting the receiver. Thus, the primary mirror elements 331 in the corresponding unsegmented section 330 do not move to compensate for the north-south component of solar motion. As the sun moves in the north-south direction, the images formed by the primary mirror elements 331 in the unsegmented section 330 will move in the north-south direction along the unsegmented portion 230 of the receiver 102. However, at the north end of the receiver where the temperature is high near the outlet 306, the primary mirror is segmented such that multiple sets 341 and 342 of multiple segments 332 of the primary mirror each focus sunlight onto corresponding single segments 241 and 242, respectively, of the receiver 102. As the sun moves in the north-south direction, the individual mirror segments 332 rotate so as to keep the image of the sun on the correct segment of the receiver. Other segments 220 of the receiver do not receive any reflected sunlight, and are therefore fully insulated.

The segmentation introduces some complexity into the tracking requirements, which will be described below. The concentration ratio achievable by segmentation depends on the number and length of the segments. For example, a large number of short segments could be used to bring the total system concentration to well above 1000. However, this adds more system complexity than is necessary to achieve a design hot-side temperature of 600 C. At peak sun (solar noon), the concentration ratio does not need to be greater than 500 to achieve a hot-side temperature of 600 C. At other times of day, however, the concentration ratio needs to be large enough that the design goals will be met even when the effective solar flux is reduced by the $\sin(\alpha)$ factor as the sun moves lower in the sky. No horizontal array of mirrors is capable of operating with the sun at the horizon, so an engineering trade is made between system complexity and the minimum solar elevation at which the system will usefully operate.

In one preferred embodiment, the primary mirror elements are formed using curves that are simple rather than compound. The terms simple and compound are used here in the mathematical sense, meaning that the surface can be formed by bending a flat sheet such as in a trough rather than deforming the sheet as would be required for a dish. In the preferred embodiment, the primary mirror elements will each form a linear image aligned with the north-south alignment of the receiver. For each mirror element, the reflected image will have the same length as the mirror element, plus a small angular divergence due to the finite diameter of the sun. As such, the additional concentration factor introduced by this segmentation will be approximately (but slightly less than) the number of mirror segments focused on a single segment of the receiver. In the most preferred embodiment, this number would be 10, giving a total CR for the system of 1200. Only 7 mirror elements per segment were shown in FIG. 4 for clarity. It should also be understood that having the primary mirror elements formed using compound curves (curved in two dimensions) will further increase the concentration ratio, but this adds additional complexity to both the mirror manufacturing process and to the steering requirements, and is unnecessary to achieve the preferred design CR target of 1200.

Receiver

Figure 2B:
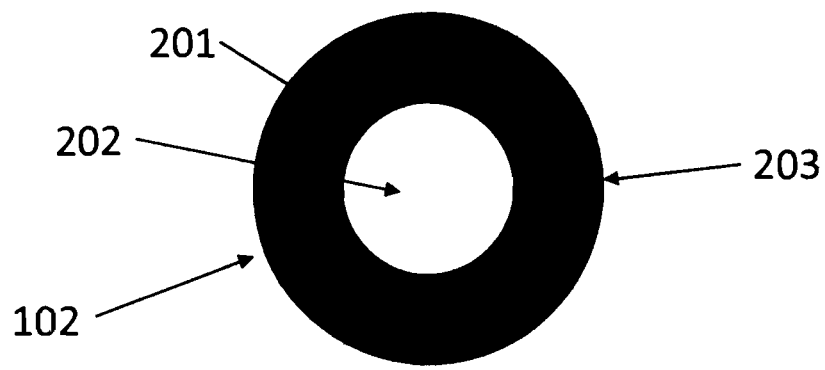
FIG. 2b is a cross-sectional end view of a fully-insulated segment of a linear receiver.

The second major subsystem of the SFSC is the receiver, illustrated in cross section in FIGS. 2a and 2b. The functions of the receiver are to accept incoming, partially concentrated, solar radiation at the entrance aperture, further concentrate it through the secondary concentrator, transfer the solar flux to the working fluid, contain the flowing working fluid, and minimize thermal losses from the working fluid to the environment. In one preferred embodiment, the receiver is stationary, horizontal, and elevated above the primary mirror. As described above, some segments of the receiver are illuminated by the primary mirror and some are not illuminated. FIG. 2a shows the cross section of an illuminated segment of the receiver, and includes a secondary concentrator to receive light from the primary. FIG. 2b shows the cross section of an unilluminated segment of the receiver. The illuminated segments, illustrated in FIG. 2a include a flow tube 201, a downward-facing secondary concentrator 204, a window 205 between the secondary concentrator and the flow tube, an absorber 202 dispersed within the flow tube 201 such that sunlight passing through the window 205 will encounter and heat the absorber, and such that the heat transfer fluid flowing through the flow tube will also encounter the absorber so that heat absorbed from sunlight by the absorber may be transferred to the heat transfer fluid (not numbered). The surface areas of the flow tube not including the window and secondary concentrator are covered by insulation 203 to minimize thermal losses from the heat transfer fluid within the flow tube. The thickness of the insulation illustrated in FIG. 2b is equal to the length of the secondary concentrator. This thickness was chosen for convenience, and it should be understood that the insulation may be thicker or thinner depending on the thermal conductivity of the insulation and the requirements for thermal management in the system. It should also be understood that the thickness of the insulation may vary over the length of the receiver as the temperature varies from the relatively cooler inlet end to the relatively hotter outlet end. The unilluminated segments of the receiver, illustrated in FIG. 2b include only a flow tube 201, and insulation 203 fully covering the flow tube. The interior 206 of the flow tube in the unilluminated segments preferably does not include an absorber since it is unneeded in these segments, and will present an impediment to the flow of heat transfer fluid through the tube.

In a preferred embodiment, the secondary concentrator 204 is a Compound Parabolic Concentrator (CPC). The CPC is a non-imaging optical concentrator designed to achieve the theoretical maximum possible concentration of light from an extended source. The geometry of the CPC includes two parabolic reflective walls, each with a focus at the opposite edge of the window. The shape and length of the parabolas (as well as the maximum concentration ratio of the CPC) depends on the intended acceptance angle. In the preferred embodiment in the SFSC, the acceptance angle of the CPC is just sufficient to incorporate all light reflected from the primary mirror array. The acceptance angle of a CPC is defined as the angle between the axis of symmetry and the path of the most extreme ray that will pass through the CPC. In a symmetric system, of course, light is collected from the extreme rays on both sides of the axis of symmetry, as well as all rays between the two extremes. To satisfy the requirement to accept all light from the primary mirror, the acceptance angle is given by $\theta=\tan^{-1}(2h/w_p)$ where $w_p$ is the width of the primary mirror and h is the height of the receiver above the mirror. The concentration ratio of the CPC, which is the ratio between the entrance and exit aperture widths, is given by $C_{CPC}=1/\sin(\theta)$. Using the concentration of the primary mirror derived above, the concentration of the total system (in the non-segmented region) is:

$$C = C_P C_{CPC}$$
$$= \frac{w_p}{2h\sin(\theta)(\tan(\theta)-\tan(\theta-\delta))}$$
$$= \frac{1}{\tan(\theta)\sin(\theta)(\tan(\theta)-\tan(\theta-\delta))}.$$

This expression is a function of the solar angular diameter δ (which cannot be changed), and the ratio between the width of the primary mirror and the height of the receiver ($\tan(\theta)=w_p/2h$). The concentration ratio of the system as a whole can be improved by increasing the height-to-width ratio, but the dependence is non-linear, and little benefit is gained by going much beyond a ratio of 1.

Working Fluid Selection

Parabolic trough concentrators typically use liquids as working fluids. Liquids have been preferred for this application because they have high volumetric specific heats, meaning it is not necessary to pump a large volume through the absorber, so the absorber tube can be smaller. As the working temperature gets higher, however, the use of liquids becomes more problematic. One essential requirement of the working fluid is that it remains fluid over the entire temperature range of the collector. It is difficult to find a material that will remain in the liquid phase over the range from room temperature up to 650 C and those that do will often have very high vapor pressures at the higher temperature.

In one embodiment of the SFSC, it is accepted that the fluid in the hot section will need to be in the vapor phase, and to assume for simplicity, therefore, that the working fluid will be in the vapor or gas phase throughout the system. The primary drawback is that gas-phase working fluids have much lower volumetric specific heats than liquids, so correspondingly larger volumes of fluid must be pumped through the absorber. This drawback is partially offset by the lower viscosities of gases compared to liquids, making them easier to pump. Nevertheless, a gas-phase working fluid will require a significantly larger pipe cross section if pumping power requirements are to be useful. However, the SFSC receiver incorporating insulation over the unilluminated surfaces to minimize heat loss makes it possible to increase the flow channel diameter without significant thermal losses.

In particular, the diameter of the flow tube can be larger than the width of the entrance window, as illustrated in FIG. 2a, without reducing the concentration ratio. In selecting the gas to use as the working fluid, one must consider thermal and transport properties (density, specific heat, viscosity), all of which vary with temperature. Also important are materials compatibility (of greater significance at high temperatures), cost, safety, and environmental compatibility. Preferred gas-phase working fluids include nitrogen, argon, carbon dioxide, methane, and water vapor. Other hydrocarbons, such as the longer-chain alkanes (particularly pentane), have even better thermal and transport properties, but their tendency to undergo pyrolysis at elevated temperatures would probably limit their use to temperatures well below 600 C in a single temperature system. Nevertheless, they could be very useful in two-temperature systems, as described below. Carbon dioxide and methane both have excellent thermal and transport properties, are low cost, and present very low environmental hazards. Methane does present a combustion hazard, and it may be susceptible to pyrolysis at high temperatures contemplated for the preferred system. With both of these gases, the potential for materials compatibility issues is small at room temperature, but must be considered at high temperatures. Nitrogen and argon, which have less desirable thermal and transport properties than carbon dioxide and methane, present a much lower risk for materials compatibility issues and no environmental or safety hazards. Argon in particular, being an inert gas, will be compatible with all materials. Water might be used in the gas phase as low-pressure vapor, but is useful only as long as the cold-side temperature is high enough to prevent condensation.

Figure 12:
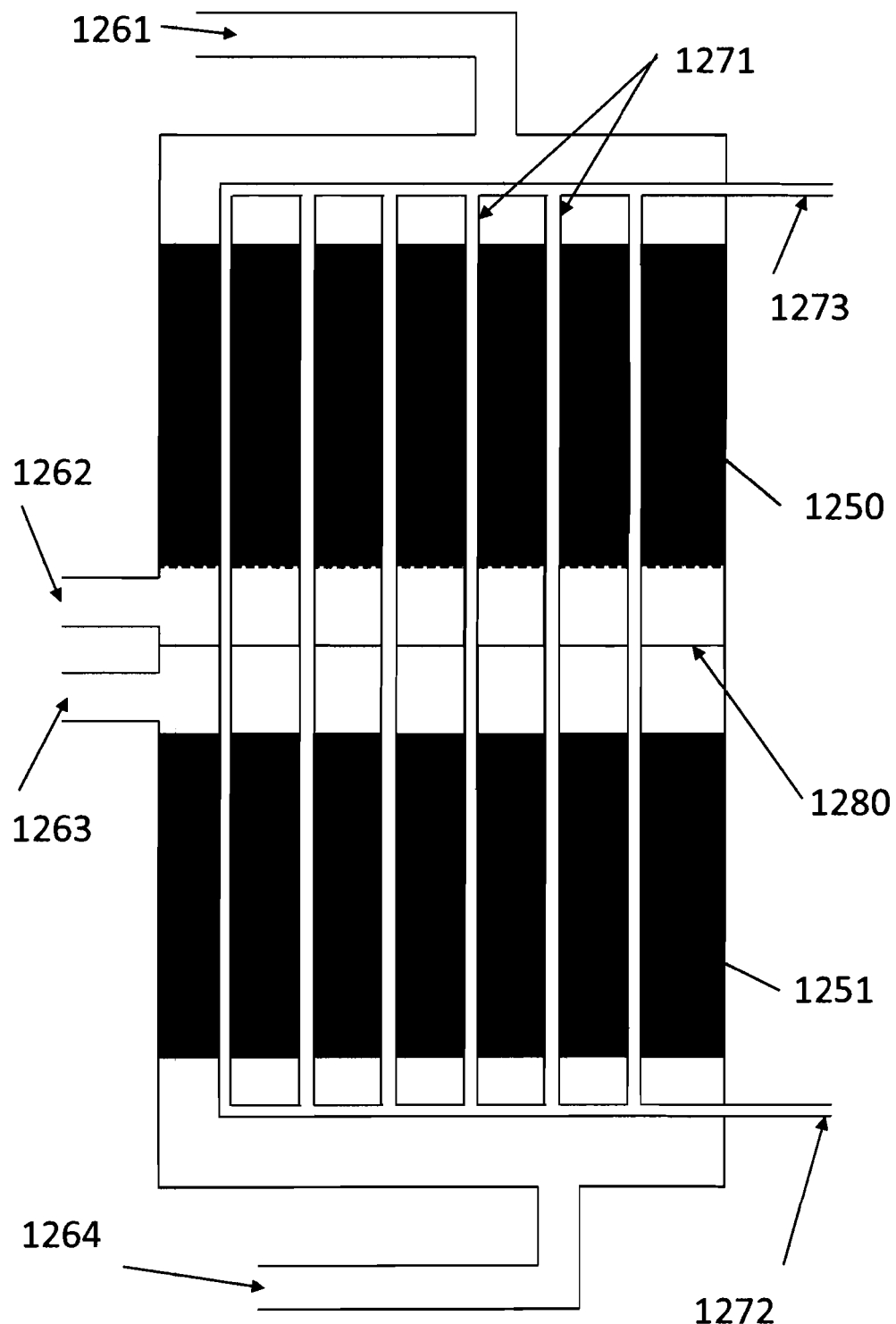
FIG. 12 shows a packed bed thermal storage unit with an embedded heat exchanger and an intermediate temperature outlet and inlet.

The key fluid properties that affect system efficiency are the volumetric specific heat and the viscosity. The relevant factor is how much power is required to pump enough gas to absorb all of the solar heat incident on the receiver. At a given incident solar power, a higher volumetric specific heat means less volume will need to be pumped to absorb all the heat, while a lower viscosity means less power will be required to pump a given volume. While the volumetric specific heat of a gas can be increased without substantially changing the viscosity simply by increasing the gas pressure, high-pressure operation of the system leads to requirements for pressure containment hardware throughout the gas-handling system, so it is preferable to operate near atmospheric pressure if possible. In a preferred embodiment, the system would operate at slightly above atmospheric pressure so that any leak in the system would result in the heat-transfer fluid leaking out rather than air leaking in. The required pumping power is also decreased by decreasing the length or increasing the diameter of the flow tube or conduit. The effect of the various factors on pump power is non-linear, particularly when accounting for the temperature dependence of the fluid properties. In general, of the gases considered, methane has the best combination of thermal and transport properties, followed by water vapor, carbon dioxide, nitrogen, and argon, in that order. Because of the possibility of pyrolysis of methane at higher temperatures, a preferred embodiment for safety and simplicity would use water vapor as the heat transfer fluid, but it should be understood that any fluid with a suitable combination of fluid properties could be used instead. An alternative embodiment of the SFSC uses a two-temperature system in which methane or pentane is used to collect heat at the lower temperatures while water vapor is used at higher temperatures. The working fluid in the Rankine loop of the power cycle would then cycle through two heat exchangers sequentially; as illustrated in FIG. 12; in the first, it would be warmed by the methane or pentane and in the second it would be further warmed by the water vapor.

Another important parameter in selection of working fluid is how it fits in with an overall system that includes thermal storage. The use of a gas-phase working fluid, as opposed to liquids, presents advantages in this area that will be discussed in more detail below. A final advantage of using an atmospheric-pressure gas is that, if it is not intrinsically expensive, or harmful to the environment, then mirror leaks do not present serious issues of cost, environmental compatibility, or operational reliability. In fact, with methane, water, or carbon dioxide, for example, any small leak would result in the formation of a warm gas plume that would be clearly visible to (and easily quantifiable by) infrared cameras, thereby providing a simple leak-detection method.

Absorber

With a gas-phase working fluid, transparent to most wavelengths of sunlight, it will be necessary to have an absorber in the system. There are two possible approaches to this. One is to have the receiver flow tube, or conduit, itself act as an absorber and the second is to have a transparent flow tube, or a window in the flow tube, with the absorber inside the pipe. In either case, the heat collected by the absorber must be transferred to the working fluid. In the case of the non-transparent flow tube, the incident sunlight must be absorbed at the surface and converted to heat, then conducted across the thickness of the flow tube wall, and finally transferred to the working fluid inside the flow tube. The heat transfer at each step will require a temperature difference, meaning that the absorber surface will need to be hotter than the working fluid. In addition, in this configuration the absorber surface area is essentially limited to the area of the exit aperture of the secondary concentrator, so the heat flux per unit of absorber will be very large.

If the flow tube is transparent, or includes a window, some incident flux will be lost to reflection (but there would also be some reflection even at the blackest of opaque absorbers). If the absorber is inside the flow tube, then the absorption surface can also be the surface where heat is transferred to the working fluid, eliminating the need for a temperature difference to drive heat transfer across the absorber. In one embodiment, the flow tube is constructed such that it is transparent only in the downward facing window, with the remainder of the flow tube coated on the inner surface with an absorbing material. As the working fluid flows through the flow tube, it picks up heat from the inner surface. In this configuration, the absorbing surface area can be larger than the entrance aperture by the ratio between the flow tube circumference and the aperture. In another embodiment, illustrated in FIG. 6, an absorber is distributed throughout the volume of the flow tube. For example a lattice of absorbing wires 606 distributed across the cross section of the flow tube 201 provides a large absorption surface area while simultaneously providing a heat transfer surface area many times the area of the inner wall of the flow tube. With the wires oriented predominantly in a longitudinal direction (parallel to the axis of the flow tube), they present little obstruction to the flow of the heat transfer fluid through the flow tube, while still presenting a very large heat transfer area. For example, in the preferred embodiment, a matrix of ten thousand wires, each 1 mm in diameter, would obstruct only 5% of the cross sectional flow area while increasing the absorption and heat-transfer surface by a factor of more than 25 relative to the area of the inner surface of the flow tube. The absorber wires do not need to have any particular enhanced absorption surface coating since any light reflected by one wire has a high probability of impinging on another rather than going back out the window. The collection of wires as a whole would act essentially as a blackbody, absorbing nearly all of the incident light, and re-radiating in the infrared according to the local temperature. Because of the exceptionally large surface area, the temperature of the absorbing surface would be only slightly higher than the local temperature of the working fluid, thereby helping to minimize radiation losses even with an emissivity essentially equal to one.

Insulation

The requirement for a large flow tube or conduit cross section means that the diameter of the flow tube will be generally greater than the width of the absorber area required to achieve the maximum concentration ratio. To avoid thermal losses from the area of the flow tube not part of the absorber, it is covered with insulation. In the segmented portion of the receiver, only certain segments are illuminated by the primary mirrors. In the unilluminated segments, the entire receiver is covered by insulation. The amount of insulation required depends on the temperature of the receiver, and the desired upper limit of heat loss.

Figure 9:
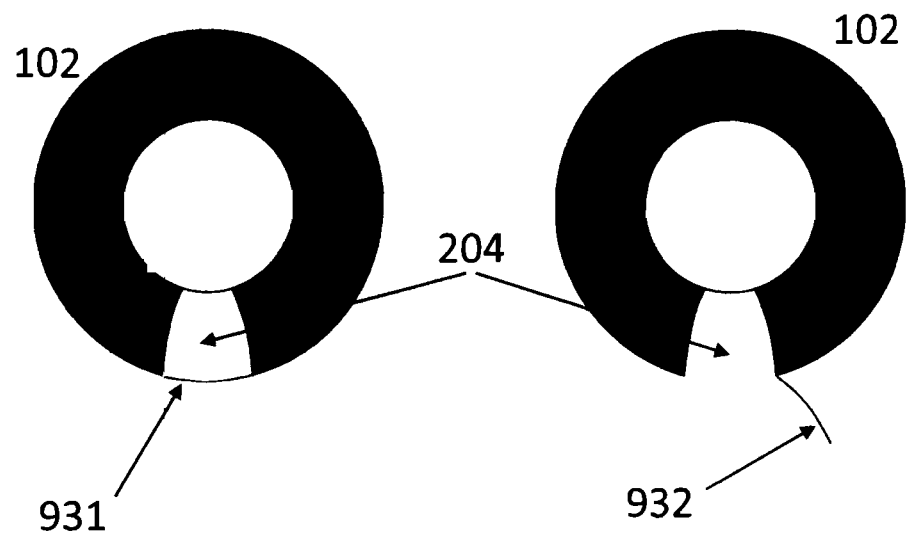
FIG. 9 shows two cross-sectional end views of a segment of a linear receiver showing closed and open covers at the entrance of the secondary concentrator.
Figure 10:
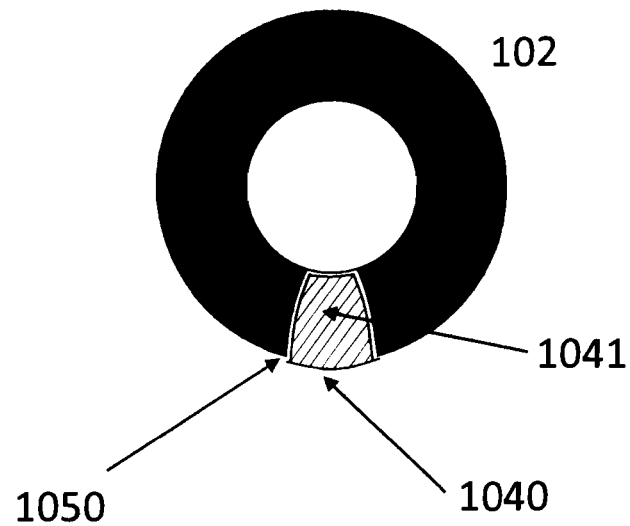
FIG. 10 is a cross-sectional end view of a segment of a linear receiver showing an insulated cover configured to move linearly along the secondary concentrator.

A closely related issue is conduction and convection losses in the uninsulated window area of the receiver. Using the preferred SFSC geometry with the receiver on a horizontal axis, the receiver window will always be facing straight down, and the area below the window will be bounded by the reflectors of the secondary concentrator, restricting lateral flows of air in that region. As such, the air in the region below the window will be thermally stratified, and heat losses through the window will be only by conduction through air (with a thermal conductivity lower still than the insulation), and by induced convection driven by wind currents causing mixing in the window region. The potential convective losses due to wind-induced air currents can be mitigated by wind screens around the entrance aperture, vertical transparent or reflecting dividers within the secondary concentrator, or with a window over the secondary concentrator. Optionally, the entrance aperture could be provided with two removable covers, one a transparent cover that would be closed only when the wind was blowing sufficiently to induce convective losses greater than the reflection losses caused by the cover, and one a non-transparent, insulated cover that would be closed either to limit thermal losses during periods of night or cloud, or to reconfigure the receiver to change the locations of the illuminated segments. This embodiment is illustrated in FIG. 9, which shows a cross section of a receiver 102 including a secondary concentrator 204. A cover 931 is shown closed over the entrance aperture of the secondary concentrator in one view, and the same cover 932 is shown in the open position in the other view. An additional option is to use insulated covers mounted with wheels on linear rails that would allow them to travel along the length of the receiver, as illustrated in FIG. 10. In this figure, the cover 1040 includes a layer of insulation 1041, and is attached to the receiver 102 on rails 1050 that allow the cover to travel along the length of the receiver. This provides for a continuous variation (with time) in the location of the insulated segments. When synchronized with solar motion, this can simplify the tracking requirements for the primary mirror elements in one of the axes.

Variable Concentration Ratio

In most concentrating solar thermal collection systems, the entire receiver operates at or near the hot-side temperature. In the SFSC, the temperature varies along the length of the collector over a range that can be as large as the temperature difference between the cold and hot sides of the Rankine system. This means that the thermal losses will also vary, and it is less critical to control thermal losses on the cold end than on the hot end. As such, it is possible to work with lower concentration ratios in the cooler sections of the receiver. This might allow, for example, a selection process on the mirrors as they are manufactured with the higher quality mirrors going to the hotter ends of the receivers, or the use of lower-precision tracking hardware on the cooler ends of the collectors.

In addition, by splitting the concentration between two separate and unequal axes in the segmented portion of the collector, it is possible to reach very high concentration ratios with only one of the axes requiring high tracking precision. Specifically, in the most preferred embodiment, the individual mirror elements in the primary mirror are each 1 m wide and 4 m long. Each mirror is a simple curve, with the long edges straight and the short edges curved to provide the focus on the linear receiver. In the segmented portion of the receiver, the open apertures are about 0.5 m wide by 4.4 m long. An uncertainty of 0.5 degrees in pointing in the short axis would require doubling the receiver aperture width while the same uncertainty in the long axis would require an increase of only 10% in the receiver aperture length. Thus, costs can be saved by reducing the tracking precision in one axis with only minimal losses in concentration ratio.

Thermal Storage

A key component of a useful CSP system is an inexpensive, high-capacity thermal storage system that is compatible with the collector. A thermal storage technique useful for efficient extraction, storage, and recovery of heat in flowing fluids uses the packed-bed thermal storage subsystem. For solar applications, such as the parabolic trough, using traditional liquid heat transfer media, a packed bed would contain the liquid in a leak-free manner to avoid potential environmental issues. As the packed bed gets large, the need for large quantities of potentially-expensive heat-transfer fluid becomes a factor because packed beds are typically at least 30% open volume, and all the open volume is preferably filled with the heat transfer fluid. In the preferred SFSC, in which the heat-transfer fluids are inexpensive and environmentally-benign gases, these issues are of little or no significance. For example, in a system using water vapor, any leak would be nothing more than a steam plume, and would represent a small loss of efficiency of the system, but would present essentially no environmental hazard. The consequent costs would be related only to the loss of efficiency and not to the cost of replacing or cleaning up the lost heat transfer fluid. With the freedom from concerns about leaks and fluid cost, ultra-large packed beds, capable of several days of thermal storage, even for utility-scale solar power systems are advantageous. At that size the cost of the storage medium can also become a factor. Like the heat transfer-fluid in the collector, the storage medium in the packed bed, preferably is stable over the whole temperature range of interest, and is compatible with other materials in the system. In one preferred embodiment of the SFSC incorporating thermal storage, the storage medium would be cobble stones, with the stones sized appropriately to the scale of the storage system. This material is inexpensive and, depending on the source rock, thermally stable at temperatures well above 600 C. In addition, if care is taken to avoid rock sources containing materials that interact chemically with water or carbon-dioxide at high temperatures, there would be no serious materials compatibility issues with the gases listed above as potential heat-transfer media. The one known exception is that many materials could act as catalysts in pyrolysis of organics, such as methane. As such, more care should be used in the selection of rock sources, or to limit the peak temperature in systems using organic heat-transfer media.

An example embodiment is designed to provide three days of thermal storage for a CSP facility producing 500 MW of electric power. Assuming that the hot-side temperature is 600 C and that the energy conversion efficiency is 40%, it will be necessary to store about 325,000 GJ of thermal energy. Using water vapor at the working fluid, the minimum cold-side temperature is 110 C (to avoid condensation and give some margin), so the temperature difference is 540 C. The specific heat of rock depends on the material, but 0.8 $J/g^{-1}K^{-1}$ is a reasonable approximation. This leads to a requirement for 825,000 tonnes of rock. While this sounds like a large number, it should be noted that a 500 MW coal-fired power plant would burn over one million tonnes of coal per year. Assuming a 35% porosity in the rock bed, and typical solid-fraction density of 2.5 $g/cm^3$, the total volume would be 500,000 cubic meters. This could be accommodated in a cylindrical container 114 m in diameter and 50 m deep. The area covered by the corresponding solar collector would be at least 4 $km^2$, so only a small fraction of the collector area would need to be dedicated to storage. It would also be possible to place the storage entirely underground, so no collector area would have to be sacrificed for thermal storage. For a lower cold-side temperature, and/or to take advantage of the better fluid properties of methane (or another hydrocarbon), a two-heat-exchanger system with two isolated SFSC collector loops would preferably be used. In this system, the working fluid in the Rankine loop would be warmed first in the low-temperature heat exchanger, followed by another heating cycle in the high-temperature heat exchanger. The relative masses (and volumes) of the two packed beds would be adjusted to maximize thermal storage while accounting for the peak allowable temperature in the low-temperature loop and the temperature-dependence of the specific heat in the Rankine working fluid. When using a single SFSC working fluid stable over the whole temperature range, such as carbon dioxide, a single packed bed could serve with a hot-side temperature of 600 C and a cold-side temperature of 40 C or lower.

Heat Exchanger

Figure 11:
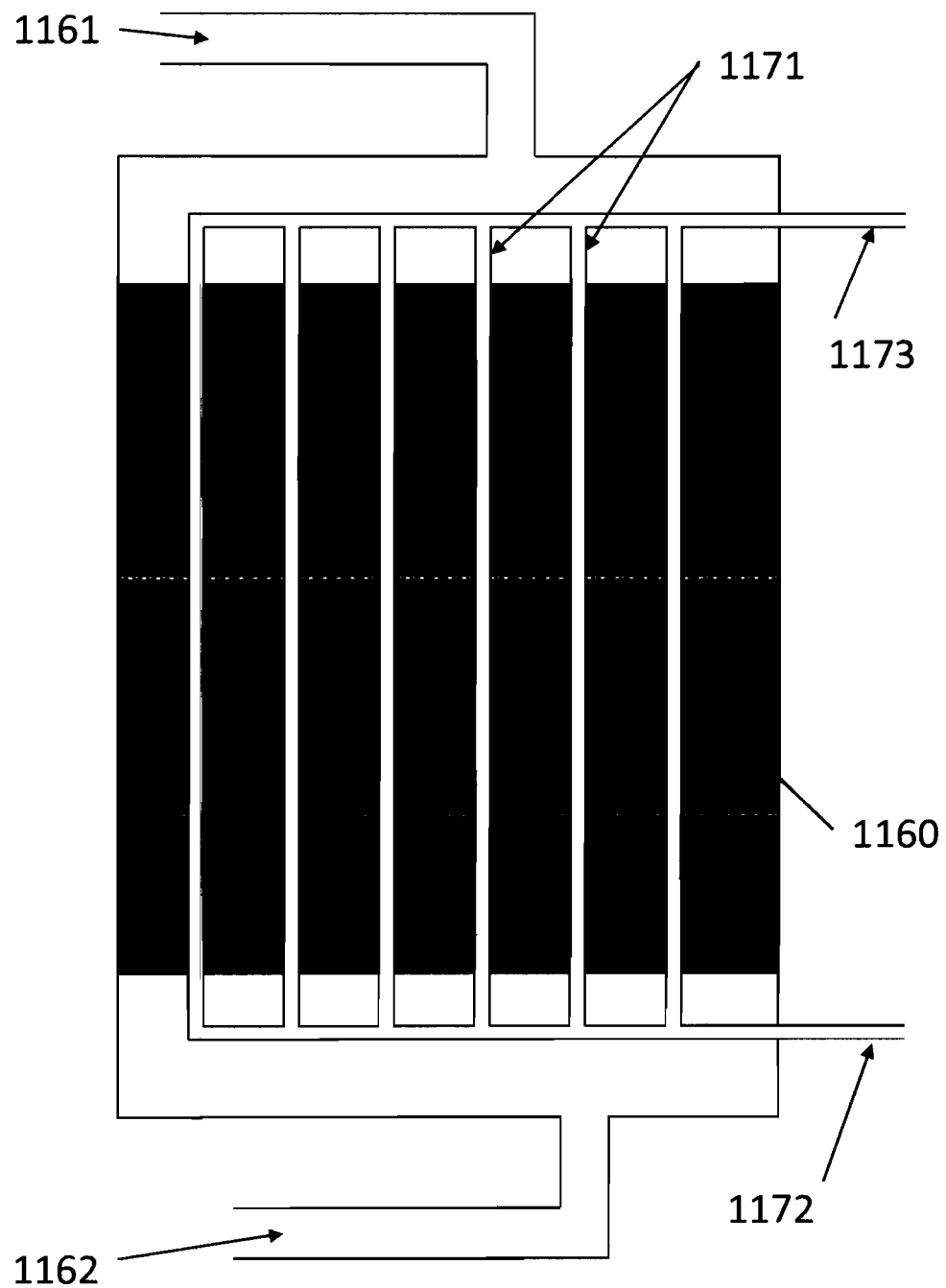
FIG. 11 shows a packed bed thermal storage unit with an embedded heat exchanger.

To optimize heat transfer between the SFSC working fluid and the Rankine fluid, it is best to use a counter-flow heat exchanger. The ultimate temperature difference between the hot side of the SFSC loop and the hot side of the Rankine loop can be decreased by increasing the surface area of the heat exchanger. While a stand-alone heat exchanger drawing from the hot side of the packed bed would work, one preferred embodiment includes a heat exchanger embedded in the packed bed, as illustrated in FIG. 11. In this embodiment, the packed bed receives heat from the heat-transfer fluid arriving from the solar collector through inlet 1161. The heat is stored in the packed bed of rock 1160. The heat-transfer fluid exits the packed bed from the bottom after being cooled by passing through the rock bed 1160. This induces a thermal gradient in the system from cold to hot, with the cold at the bottom. The Rankine loop working fluid enters the packed bed through an inlet 1172 at the bottom, flows vertically upward through heat exchanger pipes 1171 embedded in the packed bed, and exits at the top 1173. This embodiment eliminates the need for an intermediate flow loop between the packed bed and an external heat exchanger. With the height of the packed bed being 50 m or more, sufficient flow past the outer surfaces of the heat exchanger elements is provided by natural convection in the packed bed. Even in smaller scale systems, aimed at sub-megawatt applications, a packed bed no more than a few meters tall and 1-2 meters diameter with integral heat exchanger would provide a simple combination of thermal storage and heat transfer for the Rankine loop.

As noted above, gases such as higher-weight alkanes have excellent thermal and transport properties for solar concentrator applications, but are not thermally stable at high temperatures. At the same time, water vapor has good thermal and transport properties, but condenses at temperatures below 100 C. As such, neither water vapor nor high-weight alkanes are able to act as gas-phase heat-transfer fluids over the full temperature range between room temperature and 600 C. Thus, it is advantageous to use a two temperature system, incorporating two isolated solar collector loops and a single Rankine loop. The thermal storage unit for such a system is configured as illustrated in FIG. 12. In this configuration, the heat-transfer fluid from the high-temperature solar collector enters at inlet 1261, heats the rock bed 1250, and exits at outlet 1262. The heat-transfer fluid from the lower temperature solar collector enters at inlet 1263, heats the rock bed 1251, and exits at outlet 1264. The rock beds 1250 and 1251 are separated by a barrier 1280 to prevent the two heat-transfer fluids from mixing together. The cold Rankine loop working fluid enters through inlet 1272, is heated as it flows through tubes 1271 embedded in rock beds 1250 and 1251, and exits through outlet 1273. The two packed beds 1250 and 1251 are shown stacked one over the other in FIG. 12 in one preferred embodiment. It should be understand that the same function may be obtained by separating the two packed beds and connecting the plumbing between them in such a manner that the working fluids flow through them in the same functional sequence.

Solar Tracking

The following description is presented from a northern-hemisphere perspective. The same principles apply south of the equator, with the north-south directions reversed.

Solar collectors operating at high concentration ratios require tracking subsystems to ensure that the light reflected by the primary mirror falls on the receiver. The sun moves in a well-defined periodic pattern that has both daily and annual components. The daily motion is, in general, from east to west, but the elevation of the sun above the southern horizon also varies on both a daily and annual cycle. With a stationary focusing mirror, the image of the sun would move over a complex pattern with both north-south and east-west components. In dual-axis systems, mirror positions are continuously adjusted to compensate for the motion of the image in both directions. In single-axis systems, the mirror and the receiver are elongated in one of the directions (typically north-south) so that motion of the image in that direction will not move it off the receiver (neglecting end effects). In defining the motion of the sun, and the tracking requirements for the mirrors, it is useful first to decide on an appropriate set of coordinates. In Earth-oriented spherical coordinate systems, the coordinates used are typically latitude and longitude (and altitude if three dimensions are required), which are defined with respect to the Earth's rotational axis, and a reference longitude (Greenwich England). In this coordinate system, the sun will always move at a constant longitudinal speed of 15 degrees per hour, and will oscillate sinusoidally between 23 degrees south and 23 degrees north latitude with a one-year period.

Figure 13A:
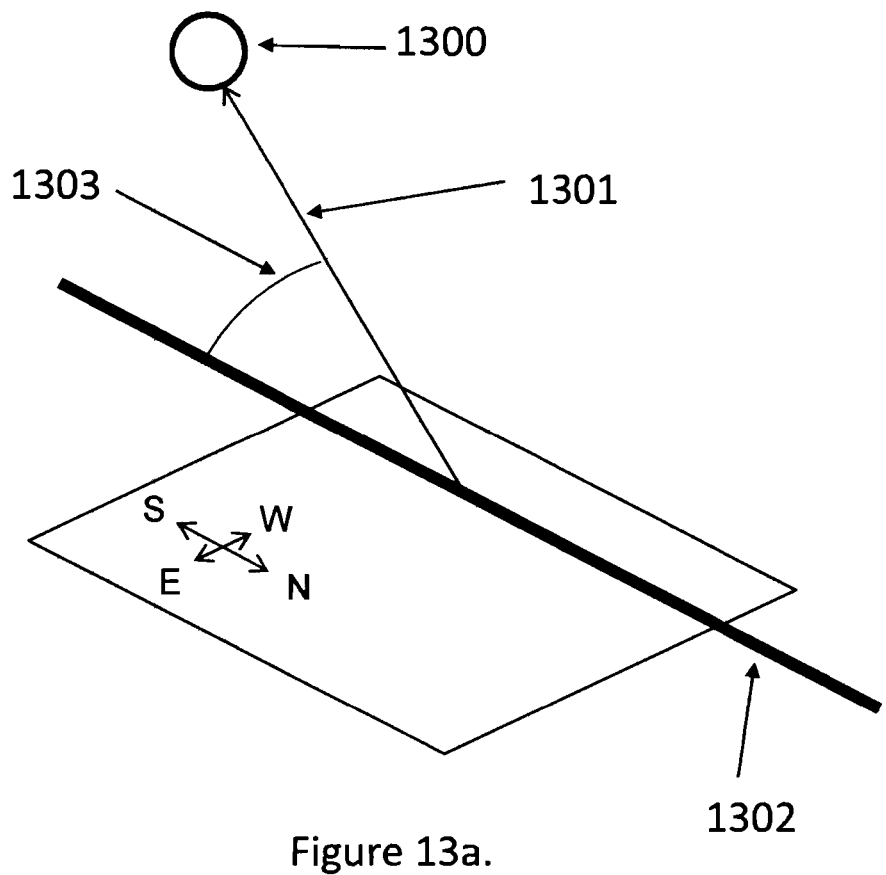
FIG. 13a shows the geometry defining the specific latitude.
Figure 13B:
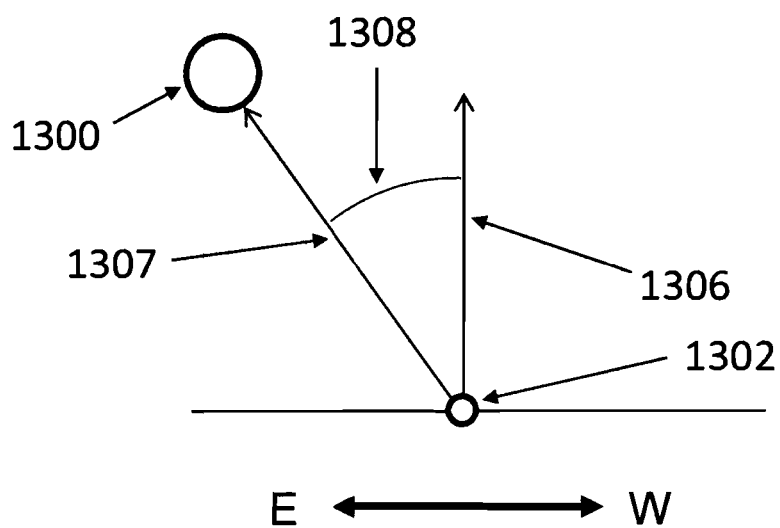
FIG. 13b shows the geometry defining the specific longitude.

In designing the mirrors for a concentrating solar collector, one needs to know the position of the sun relative to the local vertical and the local north-south axis. While it is possible to define the motion of the sun with respect to a solar collector using an Earth-based coordinate system, it is equally valid, and more convenient, to use a coordinate system based on the axis of the receiver rather than the Earth's rotational axis. An example embodiment of this coordinate system, for a case where the receiver axis is horizontal and oriented along the local north-south line, is illustrated in FIGS. 13a and 13b. In this system the equivalent of a latitude is the angle 1303 between the receiver axis 1302 and a vector 1301 pointing at the sun 1300, and is measured in a plane that includes both the receiver axis and the solar vector. This plane moves with the sun through the day. The equivalent of a longitude is the angle 1308 between the local vertical 1306 and a projection of the solar vector 1307 onto a local north-facing vertical plane (a plane perpendicular to the axis of the receiver). This projection is also the line of intersection between the local north-facing vertical plane and the plane containing the latitudinal angle. In specific longitude, zero degrees is defined to be at the local vertical. In specific latitude, zero degrees is defined to be any point in the plane perpendicular to the receiver axis. Because the distance to the sun is effectively infinite compared to the dimensions of the collector, there is no need for a third coordinate, and solar motion is defined in two-dimensions. For convenience, these two coordinates can be termed specific longitude and specific latitude. For a horizontal receiver oriented in the local north/south direction, the specific longitude and specific latitude can be defined in terms of the local solar elevation and azimuth. The specific longitude is given by $\Lambda = \chi - \arctan(\tan(\Theta)/\cos(\Phi-\chi))$ where $\Theta$ is the solar elevation, $\Phi$ is the solar azimuth, and $\chi$ is an offset to set the local vertical as the zero point of the coordinate. If the angles are expressed in degrees, $\chi=90°$, and if the angles are expressed in radians, $\chi=\pi/2$, the specific longitude varies between −90 and +90 degrees every day. The specific latitude is given by $\omega = \arccos(\cos(\Phi)\cos(\Theta)) - \chi$. The daily variation in the specific latitude depends on the local geographical latitude and the season of the year. In the northern hemisphere, the specific latitude is always minimum at solar noon, and reaches a maximum at sunrise and sunset. For a system located at the geographic latitude of 34 degrees north, on winter solstice, the specific solar latitude varies between about −57 and −30 degrees, while at summer solstice, it varies between about −11 and +28 degrees. On any given day, the difference between the minimum and maximum of the specific solar latitude is never more than about 39 degrees, while the maximum difference on annual basis is about 85 degrees. These numbers can be used to define the tracking requirements for the mirrors in the latitudinal axis.

The motion of the sun in this coordinate system is not as easily described as in the Earth-based coordinate system but, once defined, it directly translates into the motion required of the mirrors. For example, when using this coordinate system to design the drive system for the mirror/receiver combinations in a PT system, the specific latitude of the sun can be neglected, and the troughs need only track the specific longitudinal motion of the sun. The angular speed of this motion varies with season, time of day, and Earth-centered local latitude. For example, at 34 degrees north (Los Angeles, or Phoenix), the specific longitudinal motion of the sun ranges between 11.5 and 25 degrees per hour, defining the limits of the drive system for the mirrors. While the specific solar latitude does not figure into the motion of the mirrors in a PT system, it does impact the total energy collected. Since the specific solar latitude is defined with respect to the axis of the collector, it is directly a measure of the foreshortening of the sunlight falling on the mirror. As such, the total solar flux incident on the mirror is reduced relative to the normal flux by a factor of cos(ω) where ω is the specific solar latitude. Unlike the Earth-centered solar latitude, which changes only on an annual cycle, the specific solar latitude changes on both a daily and annual cycle. Defining this motion also defines the total solar flux available to the collector.

The SFSC has both single-axis and dual-axis sections. In both sections, the receiver is preferably oriented in the local north-south direction. Other orientations may be used, including non-horizontal orientations. In such cases, the specific coordinate system would be defined accordingly, and the motion of the sun in this coordinate system would be calculated. Consider first the single-axis section. Unlike the PT systems, the receiver in the SFSC is stationary, so the mirrors track at half the angular speed of the specific longitudinal component of the suds motion. Continuing the example of the previous paragraph, with the specific solar longitudinal motion ranging between 11.5 and 25 degrees per hour, the SFSC mirrors will need to move at between 6.25 and 12.5 degrees per hour. The total range of motion required of the mirrors depends on how close to dawn and dusk operation is still useful, but will be only half that of the PT system.

In the dual-axis sections of the SFSC, the mirrors also track the sun about a second axis. The choice of this axis has a significant impact on system complexity and overall efficiency. Thinking in an Earth-based coordinate system, one might be tempted to have one axis oriented in an east-west direction to track latitudinal motion of the sun, while the second axis is perpendicular to the first, tracking the longitudinal motion of the sun. Unfortunately, in this configuration, the elongated image formed by the mirrors on the receivers will be skewed relative to the axis of the receiver, and either the receiver will need to be wider, or much of the focused light will be lost. In the most preferred embodiment, the axes of rotation used to steer the primary collector mirrors are oriented in the specific coordinate system defined with respect to the collector axis. In this configuration, the first rotation axis is defined to be a tangent to a circle centered on the receiver axis, and at a radius approximately equal to the distance between the receiver and the mirror. Motion of the mirror about this axis will compensate for the specific latitudinal solar motion without causing the image to skew at the receiver. (There will be a slight defocusing at the receiver due to the changing distance between the receiver and the mirror. If the length of the mirror is not a large fraction of the distance between the mirror and the receiver, then this defocusing will be small.) The second rotation axis of the mirror is perpendicular to the first, compensating for the specific longitudinal solar motion. This longitudinal axis moves as the mirror is rotated about the latitudinal axis but, because the first axis is tangent to a circle centered on the receiver axis, the longitudinal axis is always oriented such that it is either parallel to the receiver axis or intersects the receiver axis.

Figure 3A:
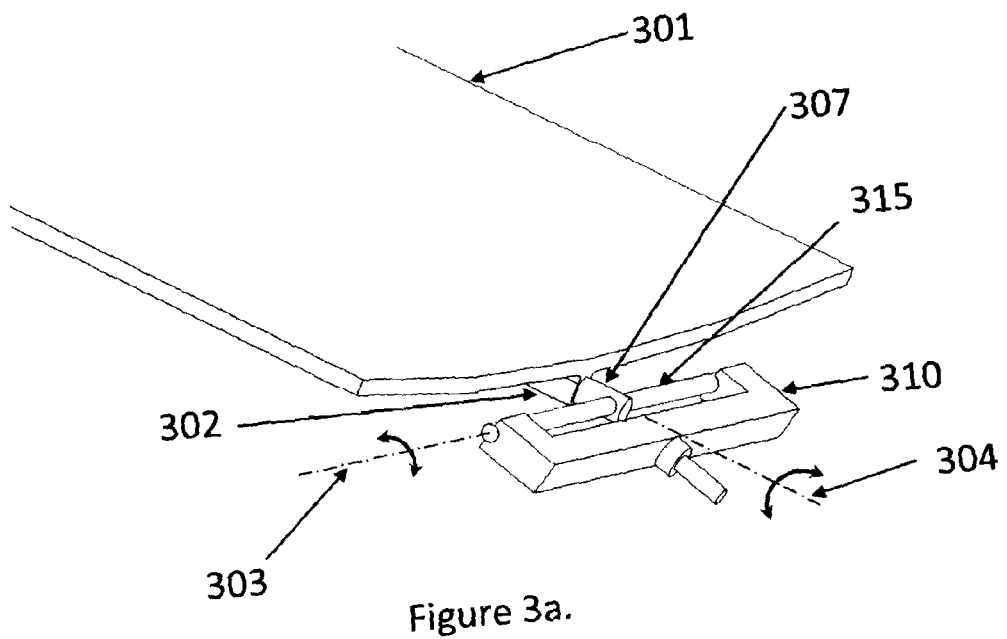
FIG. 3a is a perspective drawing of single mirror element in a segmented Fresnel solar concentrator showing a hinge configuration for two-axis steering.
Figure 3B:
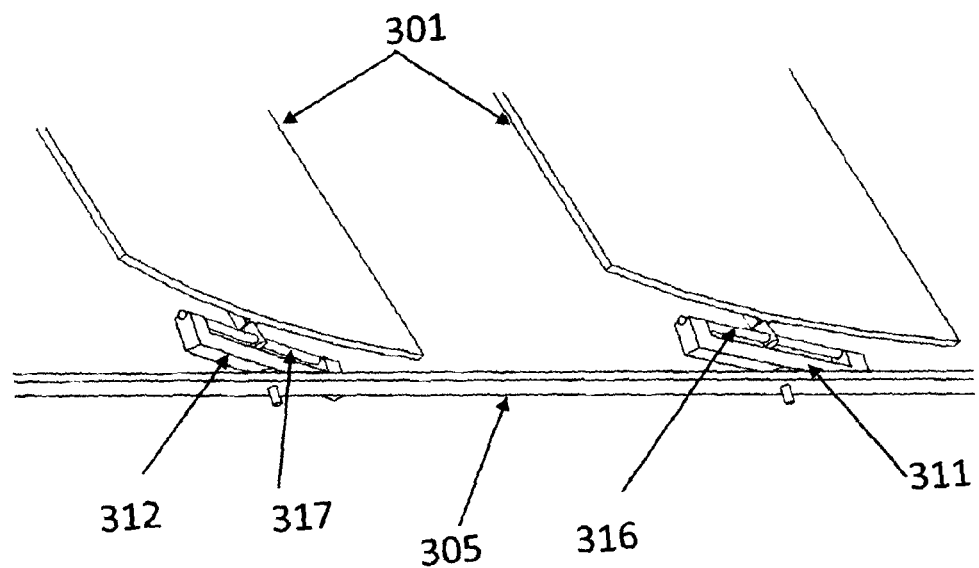
FIG. 3b is a perspective drawing of a portion of a segmented Fresnel solar concentrator showing two mirrors and their respective hinge configurations.

FIGS. 3a through 3d illustrate a mirror hinging mechanism that provides motion in this coordinate system. In FIG. 3a, stationary frame 310 and shaft 315 form a first hinge allowing the shaft 315 to rotate about the axis 303, the axis being defined by the orientation of frame 310. In addition, a second hinge formed by a shaft 307 attached to shaft 303 and sleeve 302 provides for rotation of mirror 301 about an axis 304 perpendicular to the axis of shaft 315. The axis 304 of the second hinge moves in a plane perpendicular to the axis 303 of shaft 315 as the shaft 315 is rotated in frame 310. To provide the two axes of rotation in the specific coordinate system described in the previous paragraph, the frame 310 is mounted rigidly with respect to the receiver axis (not shown) in an orientation such that the axis 303 of shaft 315 is fixed on a line tangent to a circle that is centered on the receiver axis, in a plane perpendicular to the receiver axis, with the circle having a radius equal to the distance between the receiver axis and the shaft 315. With the frame 310 locked in this orientation, the axis 304 of the second hinge will be free to rotate in a geometric plane, and that plane will necessarily contain both the axis 304 of the second hinge and the axis of the receiver. This also means that the lines defined by the axes of the receiver and second hinge will either intersect or be parallel, but they will not be skew. By forcing the rotation axes into this orientation, the planar focal zone of the parabolic mirror 301 can always be oriented by appropriate rotation about hinge 302 and shaft 315 such that it coincides with the axis of the receiver. FIG. 3b shows two mirrors 301 on their associated hinge mechanisms. The hinge mechanisms 311 and 312 are mounted on a frame 305 that is horizontal and perpendicular to a vertical plane containing the axis of the receiver. The two mirrors are not in the same location relative to the axis of the receiver, so the orientation of frame 311 relative to frame 305 is not the same as the orientation of frame 312 relative to frame 305. However, both shafts 316 and 317 are oriented with their axes tangent each to a circle as described above. Since the two shafts 316 and 317 are not at the same distance from the axis of the receiver, they are not orientated tangent to the same circle, but rather to different circles each defined as described above.

Figure 3C:
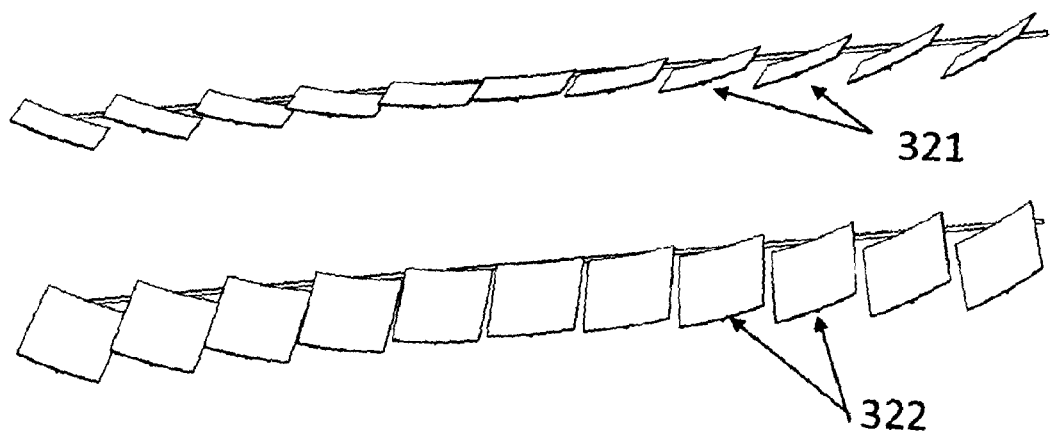
FIG. 3c is a perspective drawing of two sets of segmented mirrors, one set with zero degrees of latitudinal deflection and one set with 14 degrees of latitudinal deflection.
Figure 3D:
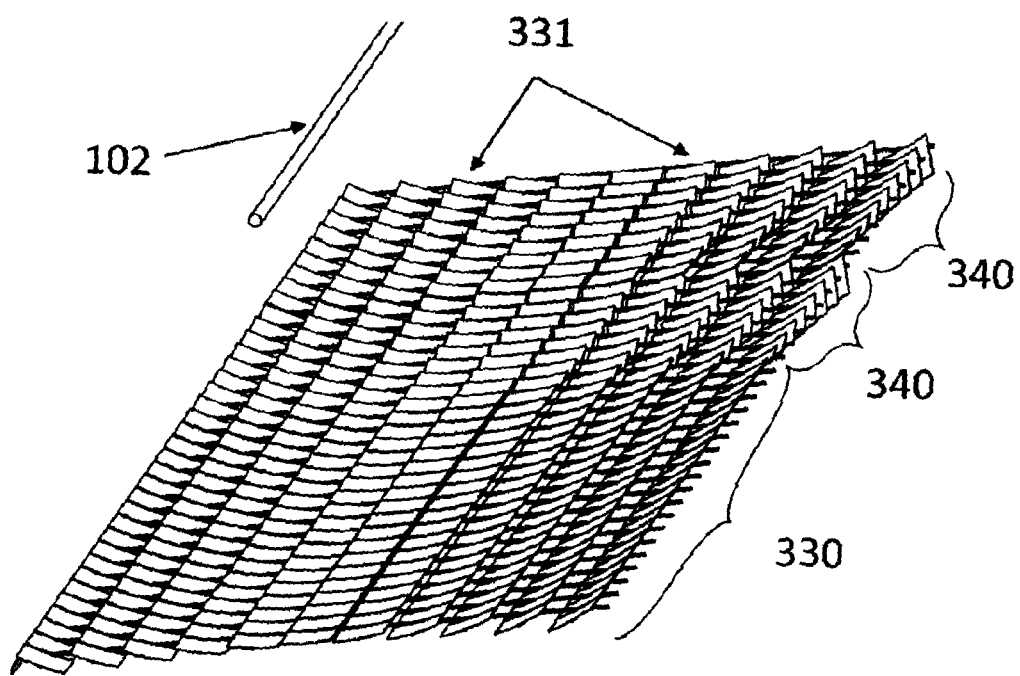
FIG. 3d is a perspective drawing of a portion of a segmented Fresnel solar concentrator showing one set of unsegmented mirrors and two sets of segmented mirrors.

FIG. 3c shows two sets of mirrors, each corresponding to a single row of mirrors in a rectangular array. The mirrors 321 are in a set with a longitudinal rotation of zero degrees while the mirrors 322 are in a set with a longitudinal rotation of 14 degrees. FIG. 3d shows a rectangular array of mirror elements with three groups of mirror sets. The group 330 of mirror sets are unsegmented; each mirror is steerable in the longitudinal direction but fixed at a latitudinal angle of zero degrees. The sunlight reflected by these mirrors falls on the receiver 102, but at an axial location that varies in response to the north-south component of solar motion. The two groups 340 each include 9 sets of mirrors such as those shown in FIG. 3c, where the latitudinal angle of each set is between 0 and 14 degrees, and increases across the group. Thus, the mirrors in each group 340 all focus on the same segment of the receiver 102. The mirrors in groups 340 are steerable on both their longitudinal and latitudinal axes as illustrated in FIG. 3a such that they can maintain the location of the reflected sunlight on the receiver 102 and in a selected axial location along the receiver 102. Drive mechanisms, not shown, control the motion of the mirrors about the defined axes either in response to a timer in response to predicted solar motion, or in response to data from feedback sensors used to measure the accuracy of the position of the reflected light with respect to the receiver.

With the mirror rotational axes defined as described, the first axis tracks only the specific latitudinal motion of the sun while the second tracks only the specific longitudinal motion of the sun. By separating the two components of solar motion in this manner, the two components of the tracking system are also separated. With the receiver element being long in the direction of its axis and short in the perpendicular direction, the precision requirements of the tracking system are also separated into two components corresponding to the two tracking axes. Specifically, the longitudinal tracking corresponds to the tracking of a PT system, provides the largest single component of the concentration of the overall system, and requires a tracking precision of the same order as that required in PT systems. In contrast, the latitudinal tracking system provides a moderate concentration factor (such as the value of 10 used in one preferred embodiment described above), and consequently can work efficiently with a much less precise tracking mechanism.

Figure 8A:
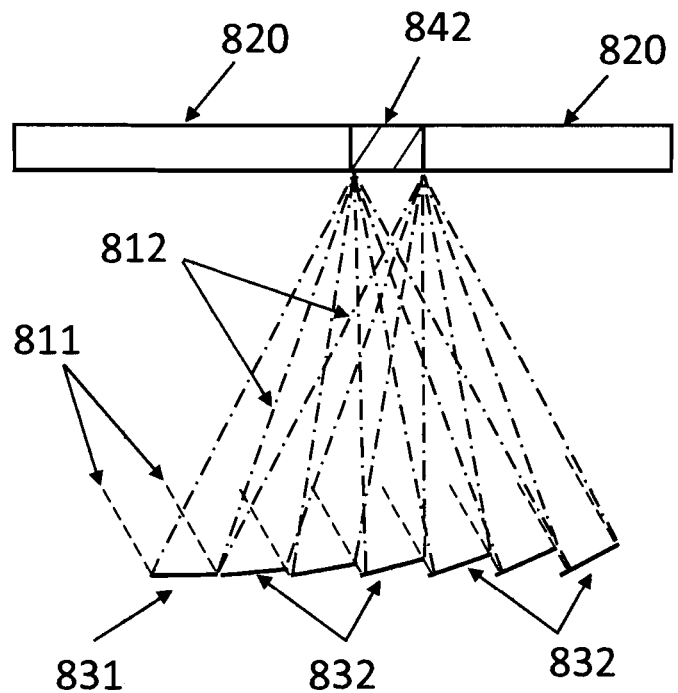
FIG. 8a is a cross-sectional side view of a segmented Fresnel solar concentrator showing the beam path and the location of the active receiver when the sun is at a specific latitude of −30 degrees.
Figure 8B:
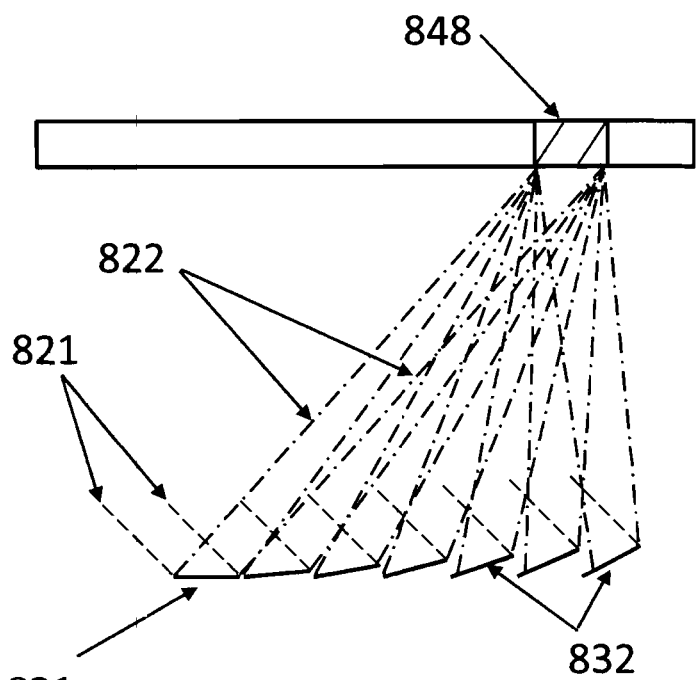
FIG. 8b is a cross-sectional side view of a segmented Fresnel solar concentrator showing the beam path and the location of the active receiver when the sun is at a specific latitude of −45 degrees.

A second advantage of the separate tracking systems is that a major part of the latitudinal tracking can be accomplished by moving the location of the uninsulated portion of the receiver as described above. This is effectively equivalent to moving the receiver itself along its axis. For example, FIGS. 8a and 8b show one set of mirror segments, all focused on one segment of the receiver. In FIG. 8a, the specific solar latitude is −30 degrees and the incoming solar radiation 811 arrives at an angle 60 degrees off the receiver axis. In FIG. 8b, the specific solar latitude is −45 degrees. Referring first to FIG. 8a, the southernmost mirror element 831 of the set of segments is in the horizontal position, while the other mirror elements 832 are offset from the horizontal sufficiently to focus the reflected solar light 812 from each of the mirror elements onto a single segment 842 of the receiver. The other segments 820 of the receiver are fully insulated. If the receiver location were stationary, the slope of each receiver element in the latitudinal axis would need to be changed as the specific latitude of the sun changes. If, instead, the receiver moves so as to track the rays reflected from the horizontal mirror element 831, mirror steering is simplified. Referring now to FIG. 8b, the incoming solar radiation 821 is arriving at an angle 45 degrees from the receiver axis, and the light 822 reflected by the horizontal mirror element 831 arrives at a location 848 on the receiver displaced to the north relative to the case shown in FIG. 8a. To compensate for this displacement, the active portion of the receiver 848 has been moved to the north, matching the location where the light 822 reflected by the horizontal mirror element 831 arrives at the receiver. Thus, the horizontal mirror element 831 would never need to move in the latitudinal direction. The other elements 832 will still need to move, but instead of needing on the order of 40 degrees of movement to track the total annual variation of the specific solar latitude, they would need to move only a few degrees to compensate for the effects of off-axis focusing. Thus, combining a receiver element moving along its axis with limited latitudinal tracking of the mirror elements results in a system that is simpler overall to build.

The use of a tracking axis optimized for controlling the position of an image along an elongated receiver can be applied to configurations other than the preferred embodiment of the SFSC. A first alternative embodiment dispenses with the tracking about the longitudinal axis and instead rotates the whole array, including the receiver, about a local vertical axis, such as by floating the array on a body of water. In this embodiment, the axis of the receiver moves such that the effective specific longitude is always zero (the axis is always aligned with the point on the horizon most directly below the solar disk). Defining the coordinate system in this case to move with the axis of the receiver, the specific latitude will vary between 90 degrees (at sunrise and sunset) and some minimum value (which may be zero if the collector is in the tropics). In the unsegmented portion of the receiver, there is no need to steer any of the mirrors. In the segmented portion of the receiver, the mirrors are steered, as above, about an axis tangent to a circle centered on the axis of the receiver.

In another alternate embodiment, the elevated horizontal receiver is replaced by a vertically-oriented linear receiver, similar to a power tower system, but with the receiver distributed along most or all of the length of the tower. Like a power tower, the primary mirrors are deployed in a substantially horizontal array. Each of the primary mirrors is steered in two axes: a first axis controlling the location of the image in the vertical direction along the tower, and a second axis aligning the image with the tower. Because the receiver is elongated in the vertical direction along the tower, the level of tracking precision required of the first steering axis is not as great as that required of the second steering axis.

Feedback Subsystems

Reflector subsystems with high concentration ratios require tracking systems to ensure that, as the sun moves across the sky, the light concentrated by the reflector arrives at the receiver. The required precision in the tracking system increases as the concentration ratio of the system increases. In the Fresnel system shown in FIG. 1, each of the mirror segments tracks the sun independently. In principle, with an accurate clock, one always knows where the sun is, and the mirror positions can be adjusted accordingly. In practice, tracking accuracies better than 1 degree are difficult because of cumulative uncertainties in design and manufacture, and due to dimensional and shape changes associated with thermal expansion and contraction.

Further improvements in tracking accuracy are achieved when using a feedback system that continuously monitors the position of the mirrors or, preferred, the position of the concentrated sunlight relative to where it is supposed to be. In one embodiment, illustrated in FIG. 7, this is accomplished by placing a set of corner-cube retro reflectors 725 around the entrance aperture 704 of the receiver, and a directional light sensor at each of the mirrors, oriented to detect light returning from the retro reflectors. Ideally, when the mirror is correctly oriented, all of the reflected sunlight hits the target. When the mirror drifts to one side or the other, some portion of the light will hit the retro reflectors and be reflected back to the mirror. A sensor at the mirror detects the intensity of the reflected light, providing information on the targeting of the mirror. The direction of the error can be indicated, for example, by placing chopper wheels in front of each of the retro reflectors, each chopper operating at a different frequency. The frequency of the reflected signal would then be used to determine the direction of the pointing error.

In another embodiment, cameras 725 are disposed around the entrance aperture of the receiver, and the images acquired by the cameras are analyzed on a regular basis to determine the degree to which each mirror in the array is illuminating each camera. Because the orientation of the cameras and receiver would not change with respect to the primary mirror elements, each element in the primary mirror would illuminate a specific (and unchanging) location on the image. The magnitude of that illumination is a good measure of the degree of misalignment in each primary mirror segment. While the thermal loads make difficult placement of a camera within the focal zone of the primary mirror array, it is believed that a small mirror in the focal zone would act essentially as a pinpoint reflector such that the reflection from each of the primary mirror elements would follow a slightly different path. These reflections could then be refocused onto a camera located to the side of the focal zone of the primary mirror array. Again, because the primary mirror and the camera would be in fixed locations relative to one another, each primary mirror element would be illuminating a specific location on the image, and the intensity of that illumination could be used as a measure of the accuracy of pointing of the primary mirror element.

Either of the feedback systems described here can also take advantage of the relatively high intensity of background light arriving from the area of the sky directly adjacent to the solar disk. Balancing the intensity of this background light on two feedback systems 725 located on opposite sides of the entrance aperture 704 of the receiver will ensure that the solar image falls on the receiver.

Advantages of the Present Systems And Methods

The various components described herein can be combined to produce a concentrating solar power system with a high collection efficiency while operating at a hot-side temperature of 600 C or higher. The higher temperature allows the power conversion subsystems to use technology already developed for fossil- or nuclear-fueled thermodynamic power systems, thereby improving the overall efficiency of the system, and reducing the cost of the generated electricity compared to alternative solar power systems.

This invention has been described in its currently contemplated best embodiment, and it is clear that it is susceptible to numerous modifications, modes, and embodiments within the ability of those skilled in the art and without the exercise of the inventive faculty. Accordingly, the scope of this invention is defined by the scope of the following claims.

The invention claimed is:

1. A solar concentrator system comprising:
   a receiver;
   multiple mirrors arranged in an array to reflect sunlight onto said receiver;
   at least one feedback sensor disposed adjacent to said receiver;
   each at least one feedback sensor comprising a corner-cube retro reflector covered by a chopper that regularly interrupts the reflected light from said retro reflector, and further wherein each chopper operates at a unique frequency.

2. A solar concentrator comprising:
   a rigid frame, said frame being rotatable about a vertical first rotation axis;
   a linear receiver having a longitudinal centerline mounted on said rigid frame;
   at least one mirror subassembly mounted on said rigid frame, said mirror subassembly comprising:
      a first hinge mounted on said rigid frame, said first hinge having a first hinge first member, a first hinge second member, and a second axis of rotation about which said first hinge first member may rotate in a first plane;
      said second axis of rotation either in a line parallel to said longitudinal centerline or in a line intersecting said longitudinal centerline;
      a mirrored surface mounted on said first hinge first member such that said mirror rotates about said second axis of rotation as said first hinge rotates; and,
      said mirrored surface positioned to reflect incident sunlight onto said linear receiver.

3. A solar concentrator comprising:
   a stationary linear receiver having a longitudinal centerline and a frame stationary with respect to said linear receiver;
   a first mirror subassembly comprising:
      a mirrored surface;
      a first hinge mounted on said frame, said first hinge having a first hinge first member, a first hinge second member and a first axis of rotation about which said first hinge first member may rotate in a first plane and relative to said first hinge second member, said first axis of rotation at a predetermined distance from said linear receiver;
      a second hinge mounted on said first hinge first member and rotatable about said first axis of rotation together with rotation of said first hinge first member, said second hinge having a second hinge first member, a second hinge second member, and a second axis of rotation about which said second hinge first member may rotate in a second plane and relative to said second hinge second member;
      said first plane and said second plane perpendicular to each other;
      said mirrored surface mounted on said second hinge first member, rotatable about said second axis of rotation together with rotation of said second hinge first member;
      said mirrored surface positioned to reflect sunlight toward said linear receiver; and,
      said first axis of rotation tangent to a circle having a radius equal to said predetermined distance, said circle having its center coincident with said linear receiver longitudinal centerline and said circle lying in a third plane, said third plane perpendicular to said linear receiver longitudinal centerline.

4. The solar concentrator of claim 3 wherein said linear receiver includes a secondary concentrator.

5. The solar concentrator of claim 4 wherein said linear receiver is oriented with its longitudinal axis substantially horizontal, and said secondary concentrator has a reflected sunlight receiving surface facing substantially downward toward said mirrored surface.

6. The solar concentrator of claim 5 further including a cover removably retained on said secondary concentrator, whereby during daylight time reflected sunlight is focused on the interior of said linear receiver upon removal of said cover.

7. The solar concentrator of claim 5 further including a cover mounted on rails positioned on said linear receiver and removably retained on said rails, whereby during daylight time reflected sunlight is focused on the interior of said linear receiver upon removal of said cover by rolling said cover along said rails to expose said interior of said linear receiver.

8. The solar concentrator of claim 5 further including at least one transparent cover, each said cover retained on a segment of said secondary concentrator whereby reflected sunlight may be focused on the interior of said linear receiver through said cover.

9. The solar concentrator of claim 5 further including at least one transparent cover, each said cover removably retained on a segment of said linear receiver whereby reflected sunlight may be focused on the interior of said linear receiver through said cover.

10. The solar concentrator of claim 5 wherein transparent or reflecting wind baffles are disposed in or around said secondary concentrator.

11. The solar concentrator of claim 4 further including a first drive means to control the rotation angle of each mirrored surface about said first rotation axis and a second drive means to control the rotation angle of each mirrored surface about said second rotation axis.

12. The solar concentrator of claim 3 wherein said linear receiver is oriented with its axis substantially horizontal with respect to Earth.

13. The solar concentrator of claim 3 further including:
   a second mirror subassembly;
   said second mirror subassembly having components and subassemblies corresponding to those of said first mirror subassembly;
   said second subassembly positioned on said frame and adjacent to said first minor subassembly;

the mirror of said first mirror subassembly positioned to reflect incident sunlight onto a first predetermined segment of said linear receiver; and, the mirror of said second mirror subassembly positioned to reflect incident sunlight onto a second predetermined segment of said linear receiver.

14. The solar concentrator of claim 13 further including:
a third mirror subassembly;
said third mirror subassembly having components and subassemblies corresponding to those of said first mirror subassembly;
said third subassembly positioned on said frame and adjacent to said second minor subassembly; and,
the mirror of said third mirror subassembly positioned to reflect incident sunlight onto a third predetermined segment of said linear receiver.

15. The solar concentrator of claim 14 further including a fourth predetermined segment of said linear receiver, and the mirrors of none of said mirror subassemblies being positioned to reflect incident sunlight onto said fourth predetermined segment of said linear receiver.

16. The solar concentrator of claim 13 further comprising:
a variable position, predetermined segment of said linear receiver;
said variable position movable along the longitudinal centerline of said linear receiver in response to changing sun location relative to said linear receiver.

17. The solar concentrator of claim 13 wherein some of said mirror surfaces have a curved surface.

18. The solar concentrator of claim 17 wherein some of said mirror surfaces are curved in the form of a parabolic trough with a line defining the deepest part of said parabolic trough aligned parallel to said second rotation axis.

19. The solar concentrator of claim 18 wherein the focal length of said parabolic trough is equal to said predetermined distance between said first hinge and said linear receiver.

20. The solar concentrator of claim 17 wherein the mirror curvature is modified from the ideal required for on-axis focusing to partially compensate for the defocusing effect of off-axis reflection.

21. The solar concentrator of claim 13 wherein multiple mirrors are arranged in a Fresnel array, with each mirror in said array having a curvature in the shape of a segment of a parabola with a focal length equal to the distance between said linear receiver and the closest mirror in the Fresnel array.

22. The solar concentrator of claim 3 wherein said linear receiver includes:
a secondary concentrator;
said linear receiver oriented with its longitudinal centerline substantially horizontal;
said linear receiver including a movable segment having a location movable along the longitudinal centerline of said linear receiver in response to changing sun location relative to said linear receiver;
said secondary concentrator having a reflected sunlight receiving surface facing substantially downward toward said mirrored surface; and,
a cover removably retained on said secondary concentrator, whereby during daylight time reflected sunlight is focused on the interior of said linear receiver upon removal of said cover.

23. The solar concentrator of claim 3 wherein said linear receiver includes:
a secondary concentrator;
said linear receiver oriented with its longitudinal centerline substantially horizontal;
said linear receiver including a movable segment having a location movable along the longitudinal centerline of said linear receiver in response to changing sun location relative to said linear receiver;
said secondary concentrator having a reflected sunlight receiving surface facing substantially downward toward said mirrored surface; and,
a cover mounted on rails positioned on said linear receiver and removably retained on said rails, whereby during daylight time reflected sunlight is focused on the interior of said linear receiver upon removal of said cover by rolling said cover along said rails to expose said interior of said linear receiver.

24. The solar concentrator of claim 3 further including thermal insulation covering the surfaces of said linear receiver not illuminated by reflected solar illumination.

25. The solar concentrator of claim 3 further including at least one additional minor subassembly, said additional mirror subassembly comprising:
a stationary frame;
a first hinge mounted on said stationary frame at a predetermined position and having a first axis of rotation;
said predetermined position of said first hinge being fixed in relation to said linear receiver such that said first axis of rotation is in a line either parallel to the axis of said linear receiver or along a line intersecting the axis of said linear receiver; and,
a mirror mounted on said first hinge such that said mirror rotates about said first axis of rotation as said first hinge rotates, is rotatable about said first axis of rotation and is positioned to reflect incident sunlight onto said linear receiver.

26. The solar concentrator of claim 3 wherein said linear receiver includes a flow tube and a gas-phase heat transfer fluid in said flow tube, wherein said gas-phase heat transfer fluid is at a pressure not more than twice atmospheric pressure.

27. The solar concentrator of claim 26 wherein said linear receiver includes a window on said flow tube and a distributed absorber disposed inside said flow tube.

28. The solar concentrator of claim 26 wherein said gas-phase heat transfer fluid is water vapor.

29. The solar concentrator of claim 26 comprising a second flow tube and a second gas-phase heat transfer fluid in said second flow tube, said first heat transfer fluid not mixing with said second heat transfer fluid.

30. The solar concentrator of claim 26 comprising a window in said flow tube wherein the width of the window is less than the diameter of said flow tube.

* * * * *